(12) United States Patent
Nomura et al.

(10) Patent No.: US 10,219,049 B2
(45) Date of Patent: Feb. 26, 2019

(54) OPTICAL RECEPTION APPARATUS, OPTICAL TRANSMISSION APPARATUS, OPTICAL COMMUNICATION SYSTEM, AND SKEW ADJUSTING METHOD

(71) Applicant: FUJITSU LIMITED, Kawasaki-shi, Kanagawa (JP)

(72) Inventors: Yoshitaka Nomura, Shinagawa (JP); Hisao Nakashima, Kawasaki (JP); Tomofumi Oyama, Kawasaki (JP); Yuichi Akiyama, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/004,704

(22) Filed: Jun. 11, 2018

(65) Prior Publication Data
US 2018/0376226 A1 Dec. 27, 2018

(30) Foreign Application Priority Data

Jun. 26, 2017 (JP) ................. 2017-124457

(51) Int. Cl.
*H04Q 3/52* (2006.01)
*H04Q 11/00* (2006.01)

(52) U.S. Cl.
CPC ......... *H04Q 3/526* (2013.01); *H04Q 11/0001* (2013.01); *H04Q 2011/0045* (2013.01); *H04Q 2011/0079* (2013.01); *H04Q 2011/0088* (2013.01); *H04Q 2213/017* (2013.01); *H04Q 2213/038* (2013.01)

(58) Field of Classification Search
None
See application file for complete search history.

(56) References Cited

U.S. PATENT DOCUMENTS

2001/0001616 A1* 5/2001 Rakib ................. H03M 13/256
375/259
2008/0080872 A1* 4/2008 Tanaka ................. H04B 10/505
398/186

(Continued)

FOREIGN PATENT DOCUMENTS

JP 2010-193204 9/2010
JP 2013-207603 10/2013

*Primary Examiner* — Ted Wang
(74) *Attorney, Agent, or Firm* — Staas & Halsey LLP

(57) ABSTRACT

An optical reception apparatus includes an equalization processor, an extraction unit, a first ratio calculator, and an instruction transmitter. The equalization processor suppresses fluctuations in amplitude of an electrical signal obtained by converting an optical signal including a plurality of pilot symbols subjected to BPSK modulation by an optical transmission apparatus. The extraction unit extracts the pilot symbols from the electrical signal with suppressed fluctuations in amplitude. The first ratio calculator calculates a ratio of an amplitude component to a phase component of each of the pilot symbols extracted by the extraction unit. The instruction transmitter transmits information relating to skew adjustment based on the ratio of the amplitude component to the phase component calculated by the first ratio calculator for each of different control values to the optical transmission apparatus.

16 Claims, 24 Drawing Sheets

(56) References Cited

U.S. PATENT DOCUMENTS

2010/0209121 A1* 8/2010 Tanimura .............. H04B 10/611
                                                                           398/202
2013/0259487 A1* 10/2013 Sakamoto .............. H04B 10/50
                                                                           398/135

* cited by examiner

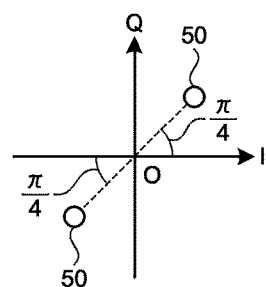
FIG.3A
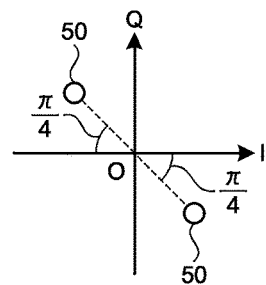
FIG.3B
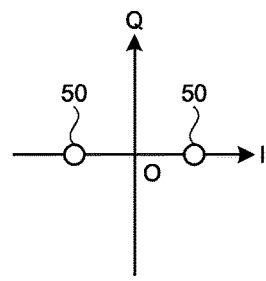
FIG.3C
FIG.4
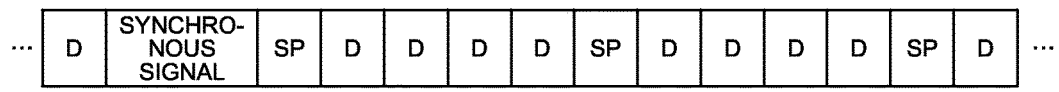

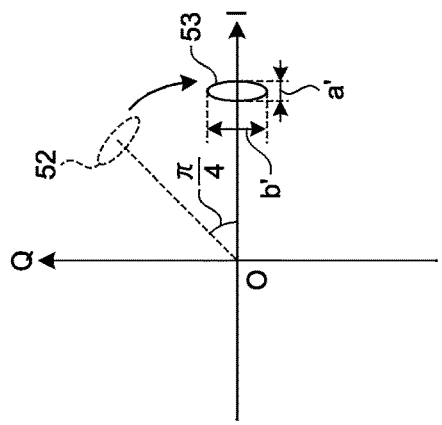
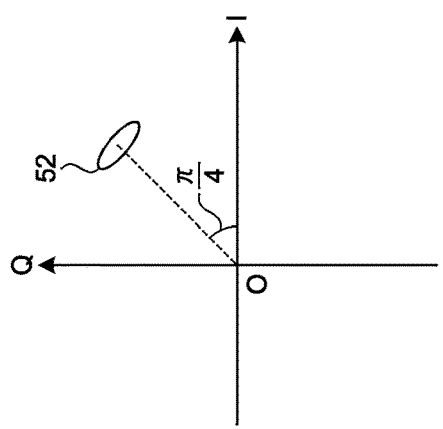
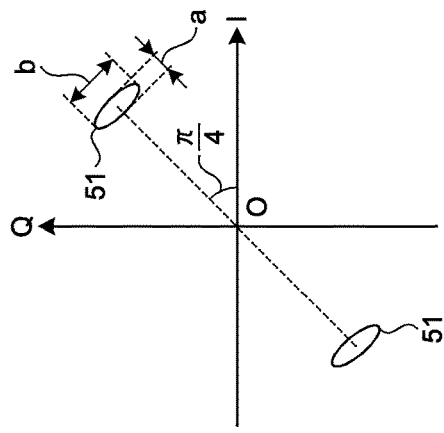

OPTICAL RECEPTION APPARATUS, OPTICAL TRANSMISSION APPARATUS, OPTICAL COMMUNICATION SYSTEM, AND SKEW ADJUSTING METHOD

CROSS-REFERENCE TO RELATED APPLICATION(S)

This application is based upon and claims the benefit of priority of the prior Japanese Patent Application No. 2017-124457, filed on Jun. 26, 2017, the entire contents of which are incorporated herein by reference.

FIELD

The embodiments discussed herein are related to an optical reception apparatus, an optical transmission apparatus, an optical communication system, and a skew adjusting method.

BACKGROUND

Signal transmission speed in trunk line optical networks increases year by year, due to increase in traffic in communication lines. For this reason, there is a demand for increase in capacity of optical networks. Effective methods for increasing capacity of optical networks include a method of increasing a multilevel number in the modulation method, and a method of increasing the symbol rate, in addition to a coherent technique. To increase the symbol rate, it is desirable to reduce skew serving as shift of phase between an I (In-phase) component and a Q (quadrature) component of the signal.

For this reason, a known technique has a structure in which skew is changed in the device on the transmission side to transmit an optical signal, the quality of the received optical signal is measured in the device on the reception side, and the skew in the device on the transmission side is adjusted on the basis of the measured quality. The quality of the received optical signal is evaluated on the basis of, for example, the bit error rate of the received data. Because the quality of the optical signal received with the device on the reception side increases when the skew is small, the skew in the device on the transmission side is adjusted to maximize the quality of the optical signal in the device on the reception side. Conventional techniques are described in Japanese Laid-open Patent Publication No. 2013-207603 and Japanese Laid-open Patent Publication No. 2010-193204, for example.

The quality of the optical signal received with the device on the reception side is influenced by various factors as well as skew. For this reason, the quality of the reception signal may differ, even when the skew is the same. In addition, in the case where the quality of the reception signal is evaluated with the error rate after error correction, when the quality of the optical signal is equal to or higher than a predetermined level, the error rate becomes 0% (error free) and causes difficulty in specification of the peak of the quality of the reception signal. This causes difficulty in adjustment of the skew with high accuracy.

SUMMARY

According to an aspect of an embodiment, an optical reception apparatus includes a converting unit, a suppression processor, an extraction unit, a first ratio calculator and an instruction transmitter. The converting unit receives an optical signal including a plurality of first pilot symbols obtained by modulating values of bits in a predetermined bit pattern by an optical transmission apparatus by a BPSK method in an IQ complex plane, and converts the received optical signal into an electrical signal. The suppression processor performs suppression processing to suppress fluctuations in amplitude of the electrical signal. The extraction unit extracts the first pilot symbols from the electrical signal having been subjected to the suppression processing. The first ratio calculator calculates a ratio of an amplitude component to a phase component of each of the first pilot symbols extracted by the extraction unit. The instruction transmitter transmits information relating to skew adjustment based on the ratio of the amplitude component to the phase component calculated by the first ratio calculator for each of a plurality of different control values for skew to the optical transmission apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A to 3C are diagrams illustrating examples of arrangement of symbols of Skew Pilot (SP) signals in a first embodiment;

FIG. 4 is a diagram illustrating an example of timings of symbols in the first embodiment;

FIGS. 7A to 7C are diagrams for explaining examples of processing performed with the first ratio calculator;

DESCRIPTION OF EMBODIMENTS

Preferred embodiments of the present invention will be explained with reference to accompanying drawings. The following embodiments do not limit the disclosed technique. The embodiments may be properly combined in a range causing no contradiction between the processes.

[a] First Embodiment

Optical Communication System 10

Figure 1:
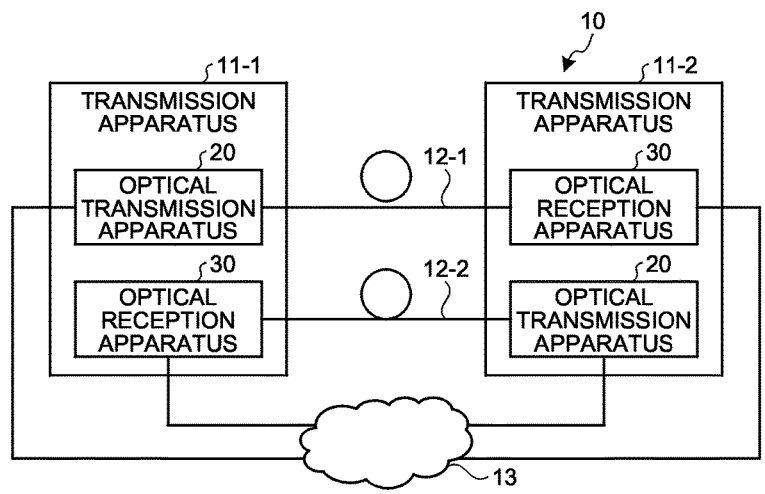
FIG. 1 is a diagram illustrating an example of an optical communication system.

FIG. 1 is a diagram illustrating an example of an optical communication system 10. The optical communication system 10 includes a plurality of transmission apparatuses 11-1 and 11-2. The transmission apparatuses 11-1 and 11-2 are mutually connected through cables 12-1 and 12-2, such as optical fibers. In the following explanation, the transmission apparatuses 11-1 and 11-2 are simply denoted as "transmission apparatuses 11" when they are generally referred to without distinguishing them from each other, and the cables 12-1 and 12-2 are simply denoted as "cables 12" when they are generally referred to without distinguishing them from each other.

Each of the transmission apparatuses 11 includes an optical transmission apparatus 20 and an optical reception apparatus 30. The optical transmission apparatus 20 transmits an optical signal to the optical reception apparatus 30 of the other transmission apparatus 11 through the cable 12. The optical reception apparatus 30 receives an optical signal from the optical transmission apparatus 20 of the other transmission apparatus 11 through the cable 12. The optical transmission apparatus 20 and the optical reception apparatus 30 are connected to a communication network 13, such as a wide area network (WAN). The optical reception apparatus 30 transmits a signal to the optical transmission apparatus 20 serving as the transmission source of the optical signal through the communication network 13. The optical reception apparatus 30 may transmit a signal to the optical transmission apparatus 20 serving as the transmission source of the optical signal through the optical transmission apparatus 20 in the transmission apparatus 11 including the optical reception apparatus 30, and through the optical reception apparatus 30 in the other transmission apparatus 11 including the optical transmission apparatus 20 serving as the transmission source of the optical signal.

In the present embodiment, the optical reception apparatus 30 of the respective transmission apparatuses 11 transmits a change instruction to change the skew to the optical transmission apparatus 20 serving as the transmission source of the optical signal, through the communication network 13, for example, before start of operation of the optical communication system 10. The optical transmission apparatus 20 changes a control value of the skew between the I component and the Q component of the optical signal by a predetermined value, in accordance with the change instruction received through the communication network 13, and transmits the optical signal modulated with the I component and the Q component with the changed skew to the optical reception apparatus 30 through the cable 12. The optical reception apparatus 30 specifies a control value to minimize the skew, on the basis of the shape of the distribution region of the symbols of the received optical signal in the IQ complex plane, for each of the control values of the changed skew. The optical reception apparatus 30 transmits a setting instruction to set the specified control value of the skew to the optical transmission apparatus 20 serving as the transmission source of the optical signal through the communication network 13. The optical transmission apparatus 20 sets the control value included in the setting instruction received through the communication network 13, as the control value of the skew. This structure enables the optical transmission apparatus 20 to start operation in the state in which the skew between the I component and the Q component of the optical signal is reduced. The setting instruction is an example of the information relating to skew adjustment.

Optical Transmission Apparatus 20

Figure 2:
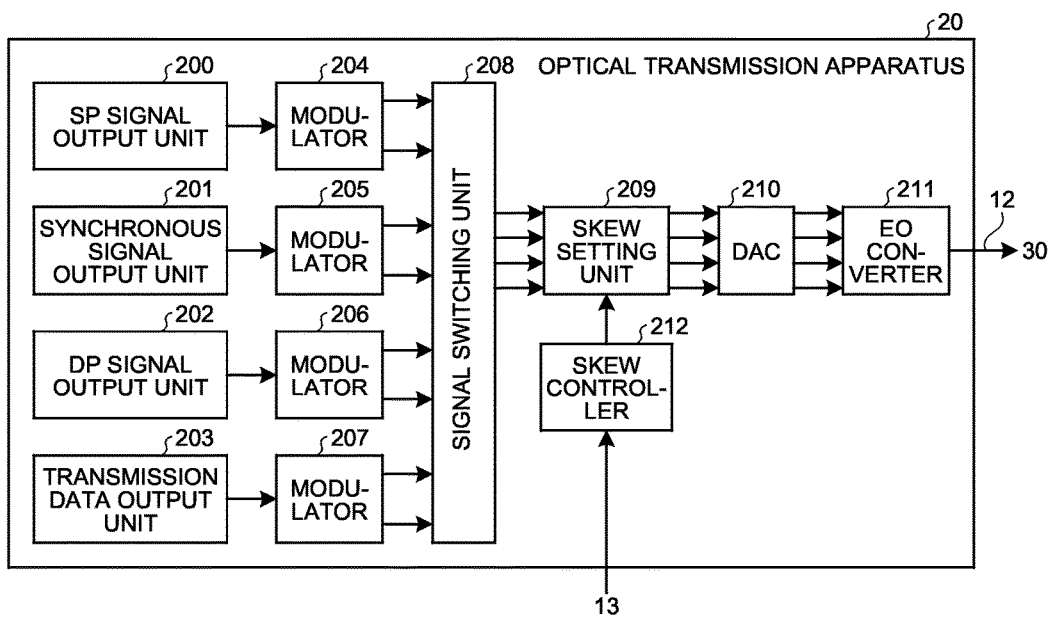
FIG. 2 is a block diagram illustrating an example of an optical transmission apparatus.

FIG. 2 is a block diagram illustrating an example of the optical transmission apparatus 20. As illustrated in FIG. 2, the optical transmission apparatus 20 includes an SP signal output unit 200, a synchronous signal output unit 201, a DP signal output unit 202, a transmission data output unit 203, a modulator 204, a modulator 205, a modulator 206, and a modulator 207. The optical transmission apparatus 20 also includes a signal switching unit 208, a skew setting unit 209, a digital to analog converter (DAC) 210, an electrical to optical (EO) converter 211, and a skew controller 212.

The SP signal output unit 200 outputs an SP signal serving as a pilot signal to detect the skew between the I component and the Q component of the optical signal. The SP signal is a certain bit pattern including a plurality of 0 and a plurality of 1. In the present embodiment, the SP signal is a bit pattern in which 0 and 1 are alternately repeated. The SP signal is not always a bit pattern in which 0 and 1 are alternately repeated, as long as it is a bit pattern including a plurality of 0 and a plurality of 1. The SP signal may be a bit pattern in which 0 and 1 are arranged at random.

The synchronous signal output unit 201 outputs a synchronous signal to notify a start timing of a symbol corresponding to the SP signal. The synchronous signal is a signal of a predetermined bit pattern. The DP signal output unit 202 outputs a DP signal serving as a pilot signal for transmission data. The transmission data output unit 203 generates transmission data, on the basis of data outputted from, for example, a communication device connected with the optical transmission apparatus 20. The transmission data output unit 203 outputs the generated transmission data. Before start of operation of the optical communication system 10, the transmission data output unit 203 outputs, for example, pseudo random data including a plurality of 0 and a plurality of 1.

The modulator 204 modulates the SP signal outputted from the SP signal output unit 200, by BPSK method using at least one of the I component and the Q component in the IQ complex plane, for each of the bits. By the modulation with the modulator 204, each of the bits of the SP signal outputted from the SP signal output unit 200 is mapped on predetermined symbols on the IQ complex plane. The modulator 204 outputs the signals of the I component and the Q component to the signal switching unit 208, for each of the symbols of the SP signal. The symbols of the SP signal modulated with the modulator 204 are an example of a first pilot symbol. The modulator 204 is an example of an output unit outputting a pilot symbol.

FIGS. 3A to 3C are diagrams illustrating examples of arrangement of symbols of the SP signal in the first embodiment. In the present embodiment, the modulator 204 modulates each of the bits of the SP signal by π/4 BPSK method. In this manner, each of the bits of the SP signal modulated with the modulator 204 is mapped on symbols 50 in the first quadrant or the third quadrant of the IQ complex plane.

The modulator 204 may perform modulation to map each of the bits of the SP signal on symbols 50 of the second quadrant or the fourth quadrant of the IQ complex plane, for example, as illustrated in FIG. 3B. As another example, the modulator 204 may perform modulation to map each of the bits of the SP signal on the I axis of the IQ complex plane, for example, as illustrated in FIG. 3C. As another example, the modulator 204 may perform modulation to map each of the bits of the SP signal on the Q axis of the IQ complex plane.

The explanation will be continued with reference to FIG. 2 again. The modulator 205 modules the synchronous signal outputted from the synchronous signal output unit 201 by a modulation method, such as Quadrature Phase Shift Keying (QPSK), for each group of a predetermined number of bits. The modulator 205 outputs the signals of the I component and the Q component to the signal switching unit 208, for each symbol of the modulated synchronous signal.

The modulator 206 modulates the DP signal outputted from the DP signal output unit 202, by a modulation method, such as QPSK, for each group of a predetermined number of bits. The modulator 206 outputs the signals of the I component and the Q component to the signal switching unit 208, for each symbol of the modulated DP signal. The symbols of the DP signal modulated with the modulator 206 are an example of a second pilot symbol.

The modulator 207 modulates the data outputted from the transmission data output unit 203 by a modulation method, such as 64 Quadrature Amplitude Modulation (64QAM), for each group of a predetermined number of bits. The modulator 207 outputs the signals of the I component and the Q component to the signal switching unit 208, for each symbol of the modulated data.

The signal switching unit 208 switches the respective signals of the I component and the Q component outputted from the modulator 204 to the modulator 207, for each of two polarized waves, and outputs the signal to the skew setting unit 209. For example, when the signal switching unit 208 is instructed to start adjustment from the skew controller 212, the signal switching unit 208 switches the symbol of the SP signal outputted from the modulator 204, the symbol of the synchronous signal outputted from the modulator 205, and the symbol of the data outputted from the modulator 207, for each of the polarized waves. In this manner, the skew setting unit 209 receives the signals of the I component and the Q component corresponding to the symbols of the synchronous signal, the SP signal, and the data in a time division manner, for each of the polarized waves, as illustrated in FIG. 4. In skew adjustment before start of the operation, the same signal may be used between the polarized waves, or different signals may be used, as each of the signals of the I component and the Q component corresponding to the synchronous signal, the SP signal, and data in each of the polarized waves.

FIG. 4 is a diagram illustrating an example of timings of the symbols in the first embodiment. FIG. 4 illustrates timings of the symbols for one polarized wave. The signal switching unit 208 generates a symbol series illustrated in FIG. 4, for each of the polarized waves. In the example illustrated in FIG. 4, "synchronous signal" indicates the timing at which the signals of the I component and the Q component corresponding to the symbols of the synchronous signal are outputted. In the example illustrated in FIG. 4, "SP" indicates the timing at which the signals of the I component and the Q component corresponding to the symbols of the SP signal are outputted. In the example illustrated in FIG. 4, "D" indicates the timing at which the signals of the I component and the Q component corresponding to the symbols of the data are outputted.

In the present embodiment, after the symbol of the synchronous signal, the symbol of the SP signal is transmitted, for example, every five symbols. Symbols of the data are arranged between the successively transmitted two symbols of the SP signal. The number of symbols of data arranged between the successively transmitted two symbols of the SP signal may be four or less, or six or more, as long as the number is one or more. When the bit pattern of the SP signal is a bit pattern in which 0 and 1 are arranged at random, no symbols of data may be arranged between the successively transmitted two symbols of the SP signal.

When the skew controller 212 issues an instruction to start operation, the signal switching unit 208 switches the symbols of the DP signal outputted from the modulator 206 and the symbols of the data outputted from the modulator 207, for each of the polarized waves, and outputs the symbols to the skew setting unit 209. In this manner, the skew setting unit 209 receives the signals of the I component and the Q component corresponding to the symbols of the DP signal and the data in a time division manner, for each of the polarized waves.

The explanation will be continued with reference to FIG. 2 again. The skew setting unit 209 sets skew between the signal of the I component and the signal of the Q component, for each of the symbols outputted from the signal switching unit 208, for each of the polarized waves, in accordance with the control value instructed from the skew controller 212. Thereafter, the skew setting unit 209 outputs the signal of the I component and the signal of the Q component including the set skew to the DAC 210, for each of the polarized waves. The DAC 210 converts each of the signal of the I component and the signal of the Q component outputted from the skew setting unit 209 for each of the polarized waves, from a digital signal to an analog signal.

Figure 28:
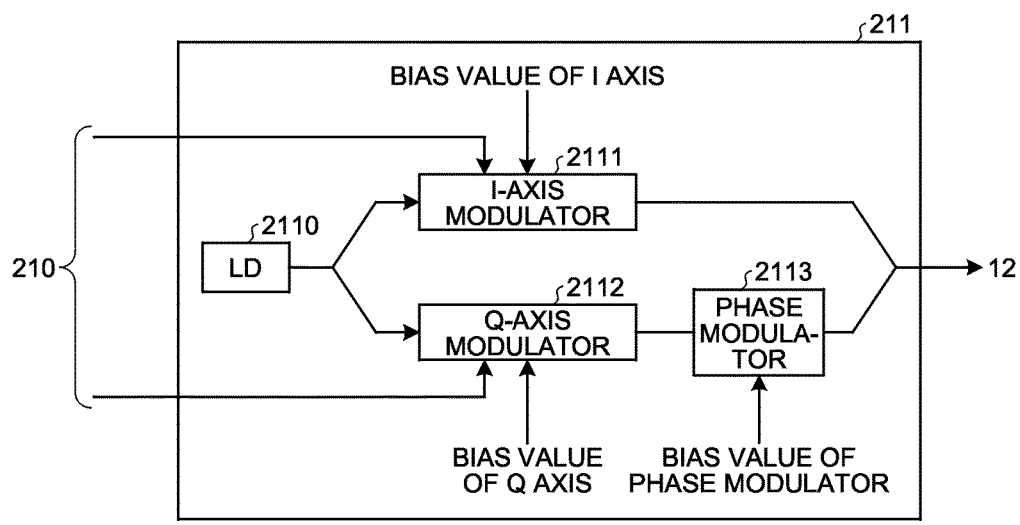
FIG. 28 is a block diagram illustrating an example of an EO converter.

The EO converter 211 converts each of the signal of the I component and the signal of the Q component converted into the analog signals with the DAC 210, for each of the polarized waves, from an electrical signal to an optical signal. The EO converter 211 synthesizes the optical signals for each of the polarized waves and outputs the synthesized optical signal to the cable 12. FIG. 28 is a block diagram illustrating an example of the EO converter 211. As illustrated in FIG. 28, the EO converter 211 includes a laser diode (LD) 2110, an I-axis modulator 2111, a Q-axis modulator 2112, and a phase modulator 2113. FIG. 28 illustrates the EO converter 211 generating optical signals of one polarized wave out of the optical signals of the two polarized waves. Generation of optical signals of the other polarized wave is achieved with an EO converter 211 having the same structure as that of FIG. 28. The light generated with the LD 2110 is input to each of the I-axis modulator 2111 and the Q-axis modulator 2112. The I-axis modulator 2111 modulates the light generated with the LD 2110 using a data signal of the I component outputted from the DAC 210 and a bias value of the I axis. The Q-axis modulator 2112 modulates the light generated with the LD 2110 using a data signal of the Q component outputted from the DAC 210 and a bias value of the Q axis. The phase modulator 2113 relatively shifts, by $\pi/2$, the phase of the optical signal outputted from the I-axis modulator 2111 and the phase of the optical signal outputted from the Q-axis modulator 2112, on the basis of a bias value thereof. The optical signal outputted from the I-axis modulator 2111 is synthesized with the optical signal having the phase shifted with the phase modulator 2113, and further synthesized with the optical signal of the other polarized wave, to be outputted to the cable 12. The EO converter 211 is, for example, a Mach-Zehnder modulator. The EO converter 211 is an example of a transmission unit.

There are cases where skew occurs in the DAC 210 and the EO converter 211, even when adjustment is performed to reduce the skew between the I component and the Q component in each of the symbols input to the DAC 210 to zero. For this reason, the skew may increase in an optical signal outputted from the EO converter 211. For this reason, skew in a direction opposite to the skew occurring in the DAC 210 and the EO converter 211 is generated in the skew setting unit 209. This structure reduces the skew in the optical signal outputted from the EO converter 211.

When the skew controller 212 receives a change instruction from the optical reception apparatus 30 through the communication network 13, the skew controller 212 successively changes the control value for the skew set with the skew setting unit 209. In the present embodiment, the change instruction includes a first change instruction and a second change instruction. When the skew controller 212 receives a setting instruction from the optical reception apparatus 30 through the communication network 13, the skew controller 212 causes the skew setting unit 209 to set the control value corresponding to the adjustment value included in the received setting instruction.

Specifically, when the skew controller 212 receives a first change instruction from the optical reception apparatus 30 through the communication network 13, the skew controller 212 instructs the signal switching unit 208 to start adjustment. Thereafter, the skew controller 212 performs the following processing on each of the polarized waves. Specifically, the skew controller 212 acquires an initial value $S_0$ of the control value for the skew, a first adjustment range $\Delta R_1$, and a first step size $\Delta S_1$, from the received first change instruction. The first step size $\Delta S_1$ is an example of the first value.

In addition, the skew controller 212 causes the skew setting unit 209 to set a control value obtained by subtracting the first adjustment range $\Delta R_1$ from the initial value $S_0$. The skew controller 212 increases the control value for the skew by the first step size $\Delta S_1$, whenever a predetermined number (for example, 1000) of symbols of the SP signal are transmitted. When the control value becomes larger than the value obtained by adding the first adjustment range $\Delta R_1$ to the initial value $S_0$, the skew controller 212 waits for a second change instruction transmitted from the optical reception apparatus 30.

When a second change instruction is received from the optical reception apparatus 30 through the communication network 13, the skew controller 212 acquires a temporary adjustment value $S_a'$, a second adjustment range $\Delta R_2$, and a second step size $\Delta S_2$, from the received second change instruction. The second step size $\Delta S_2$ is an example of the second value. In addition, the skew controller 212 causes the skew setting unit 209 to set a control value obtained by subtracting the second adjustment range $\Delta R_2$ from the temporary adjustment value $S_a'$. The skew controller 212 increases the control value for the skew by the second step size $\Delta S_2$, whenever a predetermined number (for example, 1000) of symbols of the SP signal are transmitted. When the control value becomes larger than the value obtained by adding the second adjustment range $\Delta R_2$ to the temporary adjustment value $S_a'$, the skew controller 212 waits for a setting instruction transmitted from the optical reception apparatus 30.

When a setting instruction is received from the optical reception apparatus 30 through the communication network 13, the skew controller 212 acquires an adjustment value $S_a$ from the received setting instruction. In addition, the skew controller 212 causes the skew setting unit 209 to set a control value corresponding to the acquired adjustment value $S_a$. Thereafter, the skew controller 212 instructs the signal switching unit 208 to start operation.

Optical Reception Apparatus 30

Figure 5:
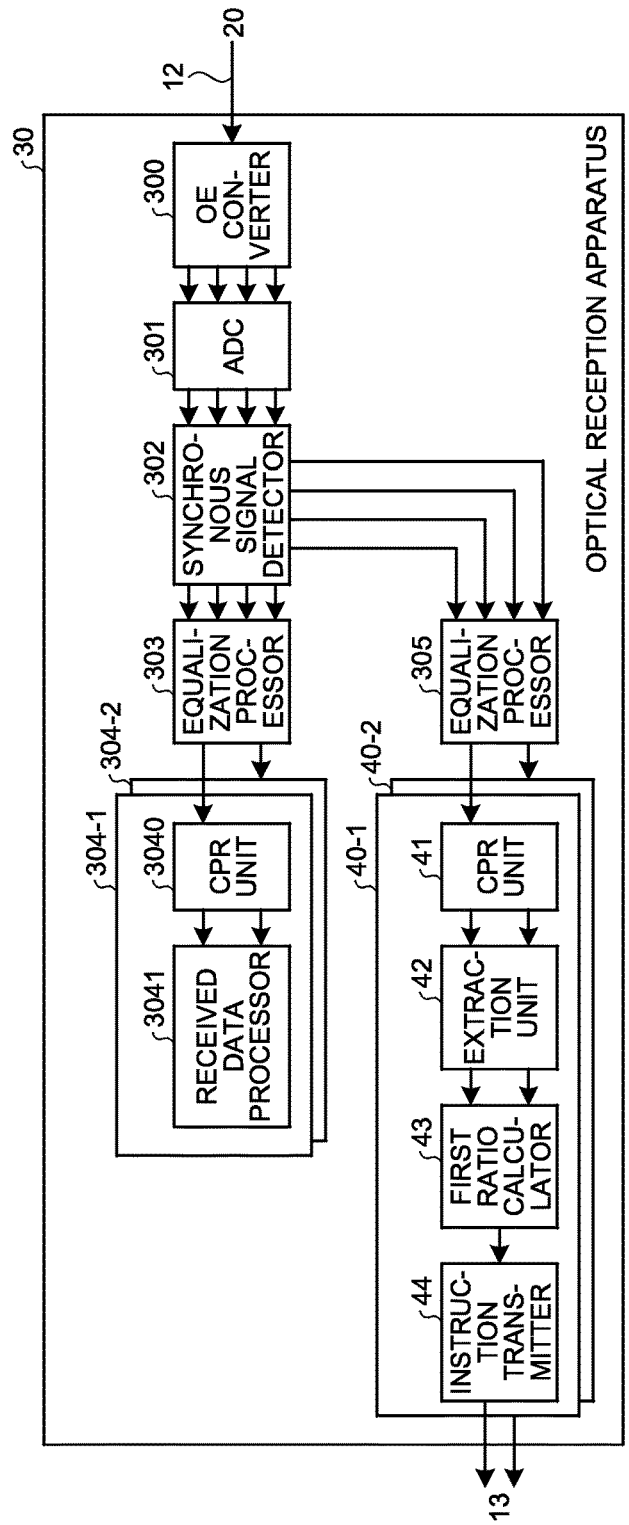
FIG. 5 is a block diagram illustrating an example of an optical reception apparatus according to the first embodiment.

FIG. 5 is a block diagram illustrating an example of the optical reception apparatus 30 in the first embodiment. As illustrated in FIG. 5, the optical reception apparatus 30 includes an optical to electrical (OE) converter 300, an analog to digital converter (ADC) 301, a synchronous signal detector 302, an equalization processor 303, and a plurality of receivers 304-1 and 304-2. Each of the receivers 304-1 and 304-2 includes a carrier phase recovery (CPR) unit 3040 and a received data processor 3041. The optical reception apparatus 30 also includes an equalization processor 305, and a plurality of adjustment processors 40-1 and 40-2. Each of the adjustment processors 40-1 and 40-2 includes a CPR unit 41, an extraction unit 42, a first ratio calculator 43, and an instruction transmitter 44. In the following explanation, the receivers 304-1 and 304-2 are simply denoted as "receivers 304" when they are generally referred to without distinguishing them from each other, and the adjustment processors 40-1 and 40-2 are simply denoted as "adjustment processors 40" when they are generally referred to without distinguishing them from each other.

The OE converter 300 separates the optical signal received from the optical transmission apparatus 20 through the cable 12 into respective polarized waves. The OE converter 300 also causes the received optical signal to interfere with local light for each of the polarized waves, to divide the optical signal into an optical signal of the I component and an optical signal of the Q component. The OE converter 300 converts the optical signal of the I component and the optical signal of the Q component into electrical signals, for each of the polarized waves. The ADC 301 converts each of the electrical signals of the I component and the Q component, from an analog signal to a digital signal, for each of the polarized waves.

The synchronous signal detector 302 detects timing of a symbol of the synchronous signal, on the basis of the signals of the I component and the Q component converted into digital signals with the ADC 301, for one of the polarized waves. The synchronous signal detector 302 may detect timing of a symbol of the synchronous signal, on the basis of the signals of the I component and the Q component of the two polarized waves. When no timing of a symbol of the synchronous signal has been detected, the synchronous signal detector 302 outputs the signals of the I component and the Q component outputted from the ADC 301 to the equalization processor 303, for each of the polarized waves. By contrast, when the timing of a symbol of the synchronous signal is detected, the synchronous signal detector 302 outputs a predetermined number of symbols from the timing of the symbol of the synchronous signal to the equalization processor 305, for each of the polarized waves.

The equalization processor 303 adjusts a tap coefficient of the filter using symbols of the DP signal included in the two paralyzed waves, to compensate linear distortion of each of the symbols outputted from the synchronous signal detector 302. The equalization processor 303 adjusts the tap coefficient of the filter using the symbol of the DP signal and a predetermined number of symbols before and after the symbol serving as the center, for each of the symbols of the DP signal of each of the polarized waves. In the present embodiment, the equalization processor 303 adjusts the tap coefficient of the filter using Constant Modulus Algorithm (CMA). The equalization processor 303 successively adjusts the tap coefficient of the filter, and filters each of the symbols outputted from the synchronous signal detector 302 using the filter with the adjusted tap coefficient, for each of the polarized waves. The equalization processor 303 outputs the signals of the I component and the Q component of each of the symbols in one polarized wave of the two polarized waves to the receiver 304-1, and outputs the signals of the I component and the Q component of each of the symbols in the other polarized wave of the two polarized waves to the receiver 304-2.

The CPR unit 3040 corrects a phase error between the local light of the optical transmission apparatus 20 and the local light of the optical reception apparatus 30, for each of the symbols of one polarized wave filtered with the equalization processor 303. The CPR unit 3040 outputs each of the symbols with the corrected phase error to the received data processor 3041.

The received data processor 3041 demodulates and decodes the data using the symbols of the data in the symbols outputted from the CPR unit 3040. The received data processor 3041 outputs the decoded data in accordance with the destination of the data, for example, to a communication device connected with the optical reception apparatus 30.

The equalization processor 305 adjusts the tap coefficient of the filter using the symbols of the SP signal included in the two polarized waves, to compensate linear distortion of each of the symbols outputted from the synchronous signal detector 302. In the present embodiment, the equalization processor 305 filters each of the symbols to suppress fluctuations in amplitude of the symbols outputted from the synchronous signal detector 302, for each of the polarized waves. The processing to suppress fluctuations in amplitude of the symbols performed with the equalization processor 305 is an example of suppression processing. The equalization processor 305 is an example of the suppression processor.

For example, the equalization processor 305 adjusts the tap coefficient of the filter using the symbol of the SP signal and a predetermined number of symbols before and after the symbol serving as the center, for each of the symbols of the SP signal of each of the polarized waves. In the present embodiment, the equalization processor 305 adjusts the tap coefficient of the filter using CMA. The equalization processor 305 successively adjusts the tap coefficient of the filter, and filters each of the symbols outputted from the synchronous signal detector 302 using the filter with the adjusted tap coefficient, for each of the polarized waves. The equalization processor 305 outputs signals of the I component and the Q component of each of the symbols in one of the two polarized waves to the adjustment processor 40-1, and outputs signals of the I component and the Q component of each of the symbols in the other polarized wave in two polarized waves to the adjustment processor 40-2.

The equalization processor 305 filters each SP signal, by performing control to fix the amplitude of the output signal as in the CMA processing. When any skew exists between the I component and the Q component in each of the symbols of the SP signal, because an SP signal is a BPSK signal and includes only two pieces of phase information that are symmetrical with respect to the origin, fluctuations in amplitude can be suppressed by performing filtering to expand the SP signal in a phase direction on the IQ complex plane. The expansion (flattening) of the SP signal filtered with the equalization processor 305 in a phase direction on the IQ complex plane changes according to the skew, and increases as the skew increases. Such a change in flattening appears only when skew exists between the I component and the Q component. When other waveform distortions exist, because the SP signal equally expands in the amplitude direction and the phase direction, the skew quantity can be detected independently of other distortions. The phenomenon of increase in flattening of the region in which the symbols are arranged together with increase in skew markedly appears when the symbols have been subjected to BPSK modulation.

The CPR unit 41 corrects a phase error between local light of the optical transmission apparatus 20 and local light of the optical reception apparatus 30, for each of the symbols of one polarized wave filtered with the equalization processor 305. The CPR unit 41 outputs each of the symbols with the corrected phase error to the extraction unit 42.

The extraction unit 42 extracts the symbols of the SP signal from the symbols outputted from the CPR unit 41. The extraction unit 42 outputs the extracted symbols of the SP signal to the first ratio calculator 43.

The first ratio calculator 43 maps each of the symbols of the SP signal extracted with the extraction unit 42 on the IQ complex plane. The first ratio calculator 43 calculates the ratio of the radial width of a circle having the origin of IQ complex plane as the center to the circumferential width of the circle, in the distribution region of the symbols of the SP signal in the IQ complex plane. Thereafter, the first ratio calculator 43 outputs the calculated ratio to the instruction transmitter 44.

First Ratio Calculator 43

Figure 6:
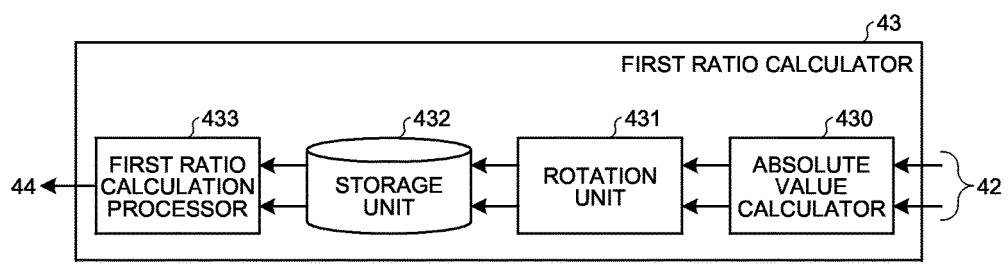
FIG. 6 is a block diagram illustrating an example of a first ratio calculator.

FIG. 6 is a block diagram illustrating an example of the first ratio calculator 43. As illustrated in FIG. 6, the first ratio calculator 43 includes an absolute value calculator 430, a rotation unit 431, a storage unit 432, and a first ratio calculation processor 433.

The absolute value calculator 430 calculates the absolute value of the amplitude of the I component and the absolute value of the amplitude of the Q component, for each of the symbols of the SP signal extracted with the extraction unit 42. The absolute value calculator 430 outputs the calculated absolute value of the amplitude of the I component and the absolute value of the amplitude of the Q component to the rotation unit 431, for each of the symbols of the SP signal.

FIGS. 7A to 7C are diagrams illustrating examples of processing with the first ratio calculator 43. In the present embodiment, because the SP signal has been modulated by π/4 BPSK method, symbols of the SP signal appear in the first quadrant and the third quadrant in the IQ complex plane, as explained in FIG. 3A, for example. The symbols of the SP signal received with the optical reception apparatus 30 are distributed in a region 51 in the first quadrant and a region 51 in the third quadrant in the IQ complex plane, as illustrated in FIG. 7A.

The symbols of the SP signal received with the optical reception apparatus 30 are distributed in a region of a predetermined range with a center being a position in the IQ complex plane mapped with the optical transmission apparatus 20, due to influence of waveform distortion in the transmission path and noise occurring in the optical amplifier or the like. When the skew between the I component and the Q component increases, the received symbols expands in a circumferential direction of a circle having a center located on the origin O of the IQ complex plane, with a center being the position in the IQ complex plane mapped in the optical transmission apparatus 20. For this reason, when the skew between the I component and the Q component increases, as illustrated in FIG. 7A, the width b in a circumferential direction of a circle having a center located on the origin O of the IQ complex plane increases with respect to the width a in a radial direction of the circle.

In addition, the absolute value calculator 430 calculates the absolute value of each of the amplitudes of the I component and the Q component. In this manner, as illustrated in FIG. 7B, the symbols corresponding to the absolute values of the amplitudes of the I component and the Q component are collected to a region 52 in the first quadrant of the IQ complex plane.

The explanation will be continued with reference to FIG. 6 again. The rotation unit 431 rotates the signals of the I component and the Q component corresponding to the absolute values calculated with the absolute value calculator 430, in a direction of −π/4 with a center located on the origin O of the IQ complex plane, for each of the symbols of the SP signal. The rotation unit 431 stores the I component and the Q component corresponding to the rotated symbols, for each of the SP signals, in the storage unit 432.

In this manner, for example, as illustrated in FIG. 7C, the region 52 in the first quadrant of the IQ complex plane is rotated in a direction of −π/4 (a clockwise direction having a center located on the origin O in FIG. 7C) around the origin O of the IQ complex plane, and moved to a region 53 on the I axis. The rotation unit 431 may rotate the signals of the I component and the Q component corresponding to the absolute values calculated with the absolute value calculator 430, in a direction of +π/4 with a center located on the origin O of the IQ complex plane, for each of the symbols of the SP signal.

The explanation will be continued with reference to FIG. 6 again. The first ratio calculation processor 433 calculates ratio of a width in a radial direction of a circle having a center located on the origin of the IQ complex plane to a width in a circumferential direction of the circle, in the distribution region of symbols of the SP signal in the IQ complex plane, with reference to the storage unit 432. The first ratio calculation processor 433 outputs the calculated ratio to the instruction transmitter 44.

Specifically, the first ratio calculation processor 433 refers to the storage unit 432, when rotation with the rotation unit 431 is finished for a predetermined number (for example, 1000) of symbols of the SP signal. The first ratio calculation processor 433 acquires data of the I component and data of the Q component corresponding to the rotated symbol, for each of the symbols of the SP signal, from the storage unit 432. The rotated symbols are distributed in, for example, the region 53 illustrated in FIG. 7C. The first ratio calculation processor 433 calculates a width a' in a direction parallel with the I axis, in the region 53 illustrated in FIG. 7C, as the width in the radial direction of the circle having a center located on the origin of the IQ complex plane. The first ratio calculation processor 433 also calculates a width b' in a direction parallel with the Q axis, in the region 53 illustrated in FIG. 7C, as the width in the circumferential direction of the circle having a center located on the origin of the IQ complex plane.

The first ratio calculation processor 433 also calculates a ratio of the calculated width a' to the calculated width b'. Specifically, the first ratio calculation processor 433 calculates the value of the width b' to the value of the width a', as the ratio. When the skew between the I component and the Q component is small, because the received symbols are distributed mainly due to waveform distortion in the transmission path and noise occurring in the optical amplifier or the like, the distribution region of symbols of the SP signal has a shape close to a circular shape. By contrast, when the skew between the I component and the Q component is large, the received symbols extend in a circumferential direction of a circle having a center located on the origin O of the IQ complex plane. Accordingly, the ratio of the width a' to the width b' is correlated with the magnitude of the skew. The phenomenon of increase in flattening of the region in which symbols are arranged together with increase in skew markedly appears when the symbols are subjected to BPSK modulation. For this reason, in the present embodiment, the distribution region of symbols of the SP signal having been subjected to BPSK modulation is used to calculate the ratio of the width in the radial direction of the circle having a center located on the origin of the IQ complex plane to the width in the circumferential direction of the circle.

The explanation will be continued with reference to FIG. 5 again. The instruction transmitter 44 transmits a change instruction to the optical transmission apparatus 20 through the communication network 13, when the skew is adjusted before start of operation. In addition, the instruction transmitter 44 specifies a control value to minimize the skew, on the basis of the ratio calculated with the first ratio calculator 43 for each of a plurality of different control values. The instruction transmitter 44 transmits a setting instruction to instruct the optical transmission apparatus 20 to set the specified control value to the optical transmission apparatus 20 through the communication network 13.

Specifically, when adjustment of the skew is started, the instruction transmitter 44 transmits a first change instruction to the optical transmission apparatus 20 through the communication network 13. The first change instruction includes the initial value $S_0$ of the control value for the skew, the first adjustment range $\Delta R_1$, and the first step size $\Delta S_1$. The instruction transmitter 44 acquires the ratio calculated with the first ratio calculator 43 using a predetermined number (for example, 1000) of symbols of the SP signal, from the first ratio calculator 43. The instruction transmitter 44 retains the acquired ratio in association with the control value serving as a value obtained by subtracting the first adjustment range $\Delta R_1$ from the initial value $S_0$. The instruction transmitter 44 retains the acquired ratio in associated with the control value obtained by increasing the control value by the first step size $\Delta S_1$, whenever the instruction transmitter 44 acquires the ratio calculated using a predetermined number of symbols of the SP signal from the first ratio calculator 43.

When the control value becomes larger than the value obtained by adding the first adjustment range $\Delta R_1$ to the initial value $S_0$, the instruction transmitter 44 refers to the values of the retained ratios. The instruction transmitter 44 specifies the value of the minimum ratio, and specifies the control value associated with the specified ratio value, as a temporary adjustment value $S_a'$.

Figure 8:
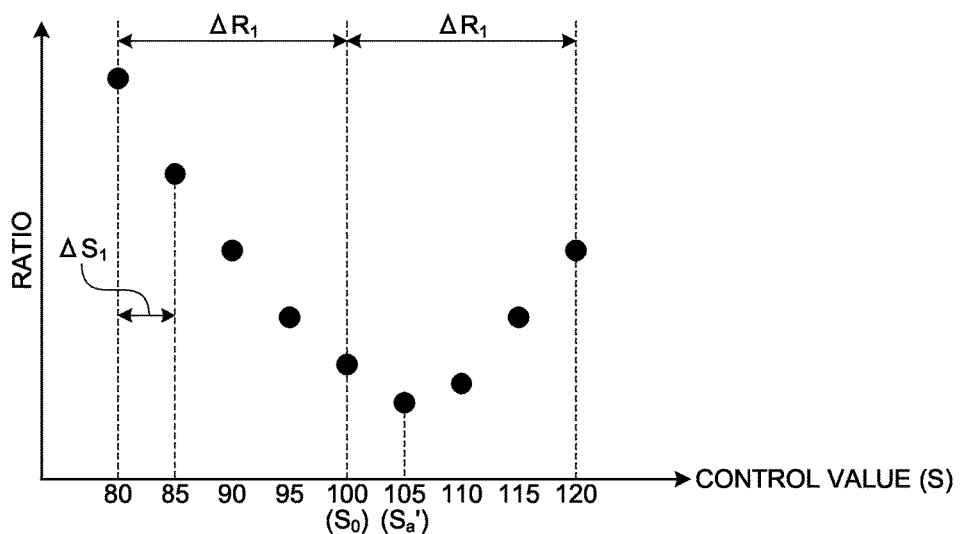
FIG. 8 is a diagram for explaining an example of a method for specifying a temporary adjustment value.

FIG. 8 is a diagram for explaining an example of a method for specifying a temporary adjustment value. As the skew increases, the ratio calculated with the first ratio calculator 43 increases. For this reason, as illustrated in FIG. 8, for example, the value of the ratio calculated with the first ratio calculator 43 changes according to the control value for the skew. FIG. 8 illustrates an example in which the initial value $S_0$ of the control value for the skew is "100", the first adjustment range $\Delta R_1$ is "20", and the first step size $\Delta S_1$ is "5". In the example of FIG. 8, when the control value for the skew is "105", the value of the ratio becomes minimum in a range of $2 \times \Delta R_1$ having the initial value $S_0$ serving as the center. In the example of FIG. 8, the instruction transmitter 44 specifies the control value "105" as the temporal adjustment value $S_a'$.

Thereafter, the instruction transmitter 44 transmits a second change instruction including the specified temporary adjustment value $S_a'$ to the optical transmission apparatus 20 through the communication network 13. The second change instruction includes the second adjustment range $\Delta R_2$ and the second step size $\Delta S_2$ and the like, as well as the temporary adjustment value $S_a'$. In the present embodiment, the value of the second adjustment range $\Delta R_2$ is smaller than the value of the first adjustment range $\Delta R_1$, and the value of the second step size $\Delta S_2$ is smaller than the value of the first step size $\Delta S_1$.

In addition, the instruction transmitter 44 acquires the ratio calculated with the first ratio calculator 43 using a predetermined number (for example, 1000) of symbols of the SP signal, from the first ratio calculator 43. The instruction transmitter 44 retains the acquired ratio in association with the control value serving as a value obtained by subtracting the second adjustment range $\Delta R_2$ from the temporary adjustment value $S_a'$. The instruction transmitter 44 retains the acquired ratio in associated with the control value obtained by increasing the control value by the second step size $\Delta S_2$, whenever the instruction transmitter 44 acquires the ratio calculated using a predetermined number of symbols of the SP signal from the first ratio calculator 43.

When the control value becomes larger than the value obtained by adding the second adjustment range $\Delta R_2$ to the temporary adjustment value $S_a'$, the instruction transmitter 44 refers to the values of the retained ratios. The instruction transmitter 44 specifies the value of the minimum ratio, and specifies the control value associated with the specified ratio value, as the adjustment value.

Figure 9:
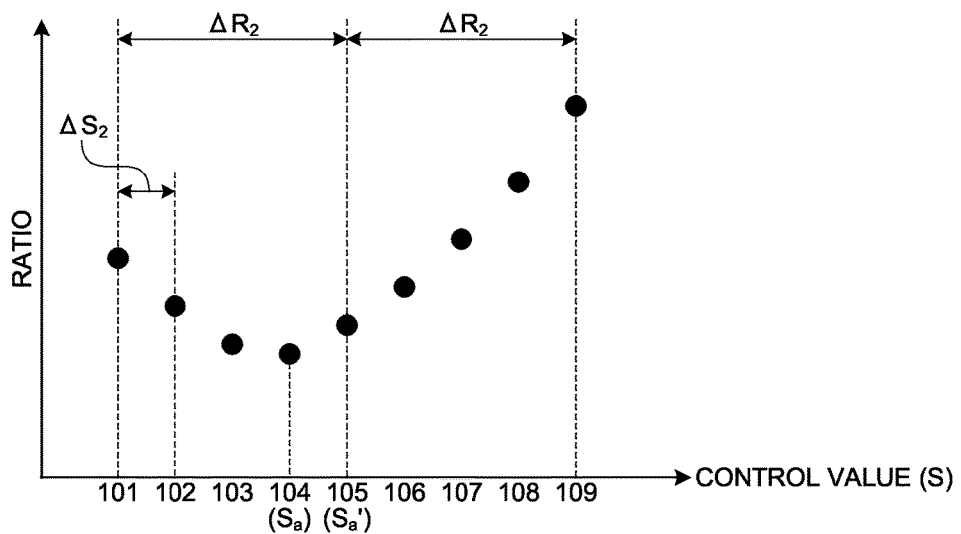
FIG. 9 is a diagram for explaining an example of a method for specifying an adjustment value.

FIG. 9 is a diagram for explaining an example of a method for specifying an adjustment value. FIG. 9 illustrates an example in which the temporary adjustment value $S_a'$ for the skew is "105", the second adjustment range $\Delta R_2$ is "4", and the second step size $\Delta S_2$ is "1". In the example of FIG. 9, when the control value for the skew is "104", the value of the ratio becomes minimum in a range of $2 \times \Delta R_2$ having the temporary adjustment value $S_a'$ serving as the center. In the example of FIG. 9, the instruction transmitter 44 specifies the control value "104" as the adjustment value $S_a$.

The instruction transmitter 44 prepares a setting instruction including the specified adjustment value $S_a$. The instruction transmitter 44 transmits the prepared setting instruction to the optical transmission apparatus 20 through the communication network 13. Thereafter, the optical reception apparatus 30 starts operation.

Operations of Optical Transmission Apparatus 20

Figure 10:
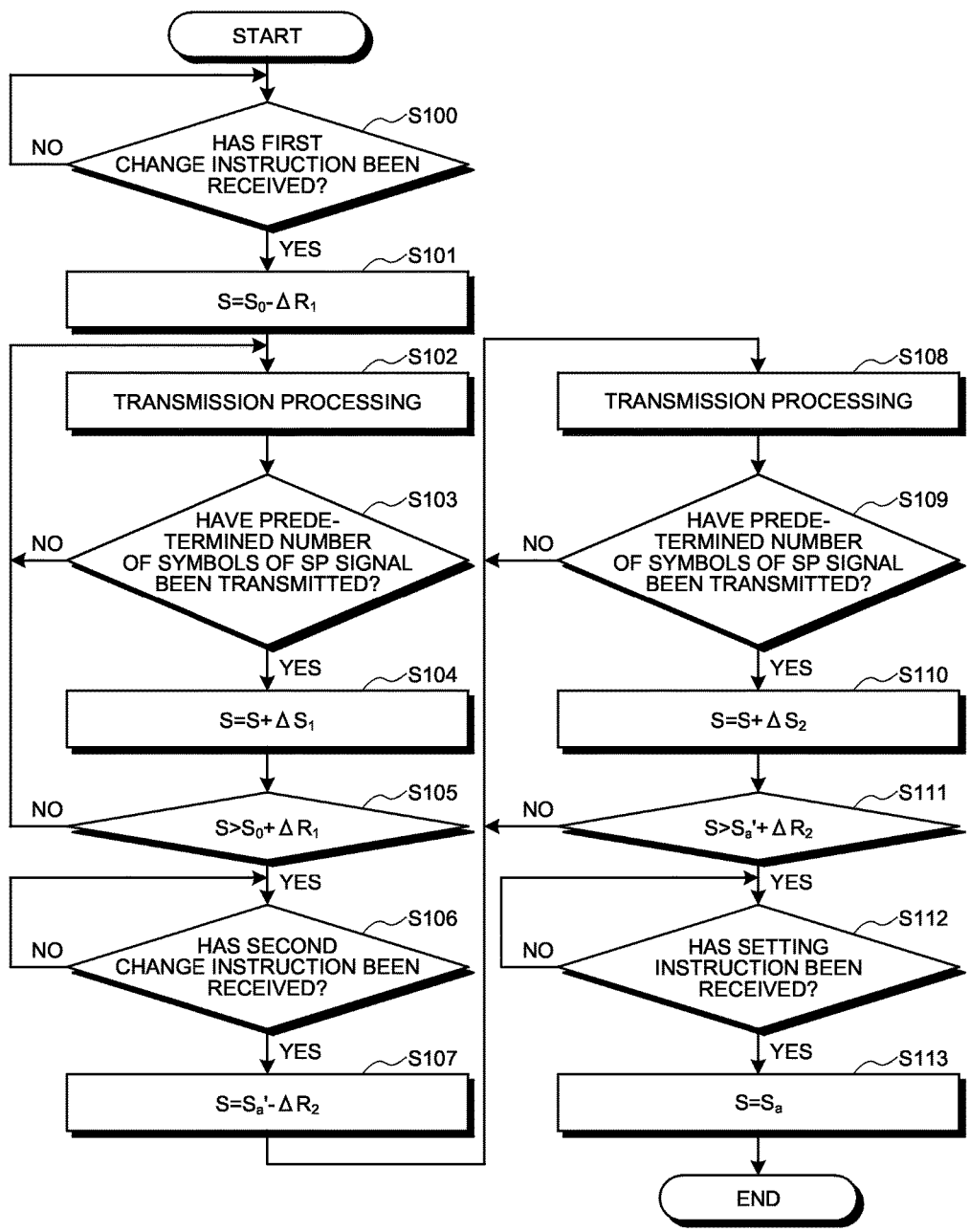
FIG. 10 is a flowchart illustrating an example of operations of the optical transmission apparatus in the first embodiment.

FIG. 10 is a flowchart illustrating an example of operations of the optical transmission apparatus 20 according to the first embodiment. The optical transmission apparatus 20 performs operations illustrated in the present flowchart before start of operation. Because the process illustrated in the flowchart of FIG. 10 is performed for each of the polarized waves, the following explanation illustrates a process for one polarized wave.

First, the skew controller 212 determines whether a first change instruction has been received through the communication network 13 (S100). When no first change instruction has been received (No at S100), the skew controller 212 executes the processing illustrated at Step S100, for example, until a first change instruction is received.

By contrast, when a first change instruction has been received (Yes at S100), the skew controller 212 acquires the initial value $S_0$, the first adjustment range $\Delta R_1$, and the first step size $\Delta S_1$ included in the received first change instruction. Thereafter, the skew controller 212 calculates a value obtained by subtracting the first adjustment range $\Delta R_1$ from the initial value $S_0$, as a control value S for the skew (S101). Thereafter, the skew controller 212 causes the skew setting unit 209 to set the calculated control value S.

Thereafter, the optical transmission apparatus 20 performs transmission processing (S102). At Step S102, the modulator 204 generates symbols of the SP signal, the modulator 205 generates symbols of the synchronous signal, and the modulator 207 generates symbols of data. The signal switching unit 208 switches the symbols of the SP signal outputted from the modulator 204, the symbols of the synchronous signal outputted from the modulator 205, and the symbols of the data outputted from the modulator 207. Thereafter, the skew setting unit 209 sets the skew between the I component and the Q component of each of the symbols outputted from the signal switching unit 208, on the basis of the control value S instructed from the skew controller 212. The electrical signals of the I component and the Q component with the set skew are converted into optical signals, and transmitted to the optical reception apparatus 30 through the cable 12.

Thereafter, the skew controller 212 determines whether a predetermined number of symbols of the SP signal have been transmitted (S103). When no predetermined number of symbols of the SP signal have been transmitted (No at S103), the optical transmission apparatus 20 performs the processing illustrated at S102 again.

By contrast, when a predetermined number of symbols of the SP signal have been transmitted (Yes at S103), the skew controller 212 increases the current control value S by the first step size $\Delta S_1$ (S104). Thereafter, the skew controller 212 determines whether the calculated control value S is larger than a value obtained by adding the first adjustment range $\Delta R_1$ to the initial value $S_0$ (S105). When the control value S is equal to or smaller than the value obtained by adding the first adjustment range $\Delta R_1$ to the initial value $S_0$ (No at S105), the skew controller 212 causes the skew setting unit 209 to set the control value S calculated at Step S104. Thereafter, the optical transmission apparatus 20 performs the processing illustrated at Step S102 again.

By contrast, when the control value S is larger than the value obtained by adding the first adjustment range $\Delta R_1$ to the initial value $S_0$ (Yes at S105), the skew controller 212 determines whether a second change instruction has been received through the communication network 13 (S106). When no second change instruction has been received (No at S106), the skew controller 212 performs the processing illustrated at Step S106, for example, until a second change instruction is received.

By contrast, when a second change instruction has been received (Yes at S106), the skew controller 212 acquires the temporary adjustment value $S_a'$, the second adjustment range $\Delta R_2$, and the second step size $\Delta S_2$ included in the received second change instruction. Thereafter, the skew controller 212 calculates a value obtained by subtracting the second adjustment range $\Delta R_2$ from the temporary adjustment value $S_a'$, as the control value S for the skew (S107). Thereafter, the skew controller 212 causes the skew setting unit 209 to set the calculated control value S. Thereafter, the optical transmission apparatus 20 performs transmission processing (S108). In the transmission processing at Step S108, processing similar to the transmission processing illustrated at Step S102 is performed.

Thereafter, the skew controller 212 determines whether a predetermined number of symbols of the SP signal have been transmitted (S109). When no predetermined number of symbols of the SP signal have been transmitted (No at S109), the optical transmission apparatus 20 performs the processing illustrated at S108 again. By contrast, when a predetermined number of symbols of the SP signal have been transmitted (Yes at S109), the skew controller 212 increases the current control value S by the second step size $\Delta S_2$ (S110). Thereafter, the skew controller 212 determines whether the calculated control value S is larger than a value obtained by adding the second adjustment range $\Delta R_2$ to the temporary adjustment value $S_a'$ (S111). When the control value S is equal to or smaller than the value obtained by adding the second adjustment range $\Delta R_2$ to the temporary adjustment value $S_a'$ (No at S111), the skew controller 212 causes the skew setting unit 209 to set the control value S calculated at Step S110. Thereafter, the optical transmission apparatus 20 performs the processing illustrated at Step S108 again.

By contrast, when the control value S is larger than the value obtained by adding the second adjustment range $\Delta R_2$ to the temporary adjustment value $S_a'$ (Yes at S111), the skew controller 212 determines whether a setting instruction has been received through the communication network 13 (S112). When no setting instruction has been received (No at S112), the skew controller 212 performs the processing illustrated at Step S112, for example, until a second change instruction is received.

By contrast, when a second change instruction has been received (Yes at S112), the skew controller 212 acquires the adjustment value $S_a$ included in the received setting instruction. Thereafter, the skew controller 212 causes the skew setting unit 209 to set the adjustment value $S_a$, as the control value S for the skew (S113). Thereafter, the skew controller 212 instructs the signal switching unit 208 to start operation. Thereafter, the optical transmission apparatus 20 ends the operations illustrated in the present flowchart, and operation of the optical transmission apparatus 20 is started.

Operations of Optical Reception Apparatus 30

Figure 11:
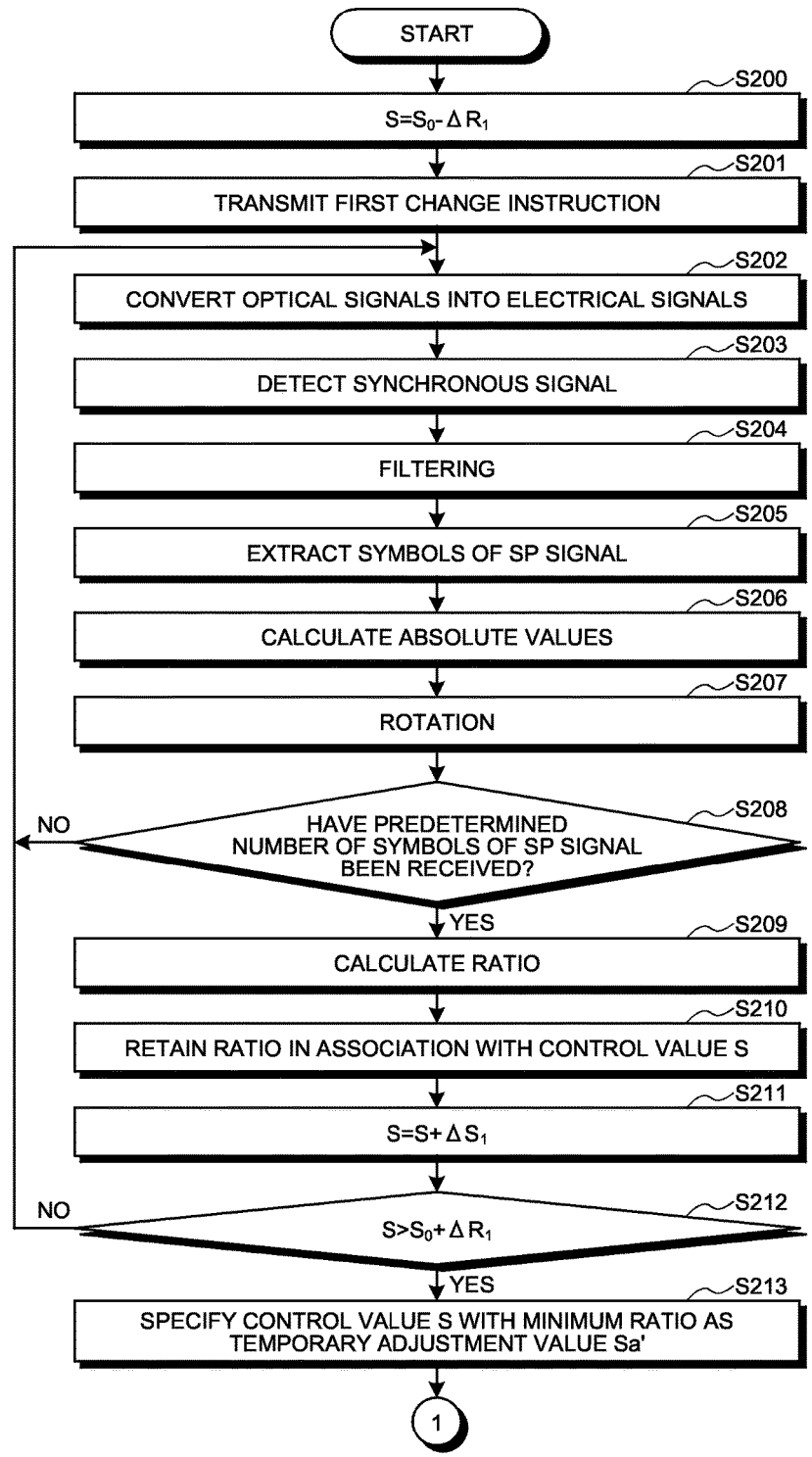
FIG. 11 is a flowchart illustrating an example of operations of the optical reception apparatus in the first embodiment.
Figure 12:
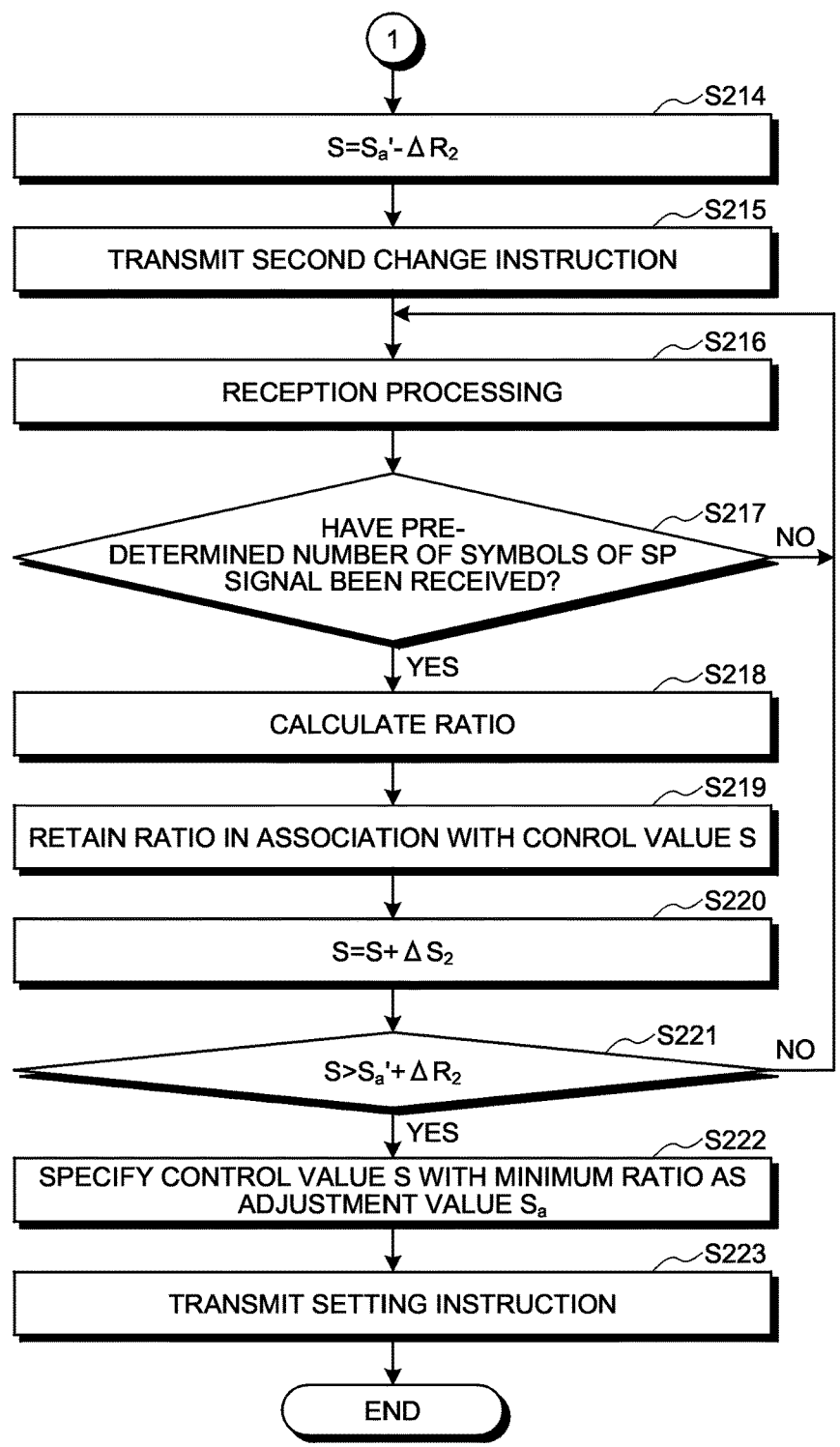
FIG. 12 is a flowchart illustrating an example of operations of the optical reception apparatus in the first embodiment.

FIG. 11 and FIG. 12 are flowcharts illustrating an example of operations of the optical reception apparatus 30 according to the first embodiment. The optical reception apparatus 30 performs operations illustrated in the present flowcharts before start of operation. Because the process illustrated in the flowcharts of FIG. 11 and FIG. 12 is performed for each of the polarized waves, the following explanation illustrates a process for one polarized wave.

First, the instruction transmitter 44 calculates a value obtained by subtracting the first adjustment range $\Delta R_1$ from the initial value $S_0$, as the control value S (S200). Thereafter, the instruction transmitter 44 transmits a first change instruction including the initial value $S_0$ of the control value for the skew, the first adjustment range $\Delta R_1$, and the first step size $\Delta S_1$ to the optical transmission apparatus 20 through the communication network 13 (S201).

Thereafter, the OE converter 300 receives optical signals transmitted from the optical transmission apparatus 20 through the cable 12, and converts the received optical signals into electrical signals (S202). The ADC 301 converts the electrical signals converted with the OE converter 300 from analog signals to digital signals. The synchronous signal detector 302 detects timing of the synchronous signal from the signals converted into digital signals with the ADC 301 (S203). The synchronous signal detector 302 outputs a predetermined number of symbols from the timing of the synchronous signal to the equalization processor 305.

Thereafter, the equalization processor 305 adjusts the tap coefficient of the filter using the symbols of the SP signal, to filter each of the symbols to suppress fluctuations in amplitude of the symbols outputted from the synchronous signal detector 302 (S204). The CPR unit 41 of each of the adjustment processor 40 corrects a phase error between the local light of the optical transmission apparatus 20 and the local light of the optical reception apparatus 30, for each of the symbols filtered with the equalization processor 305. The extraction unit 42 extracts symbols of the SP signal from the symbols outputted from the CPR unit 41 (S205).

Thereafter, the absolute value calculator 430 of each of the first ratio calculators 43 calculates the absolute value of the amplitude of the I component and the absolute value of the amplitude of the Q component, for each of the symbols of the SP signal extracted with the extraction unit 42 (S206). The rotation unit 431 rotates the signals of the I component and the Q component corresponding to the absolute values calculated with the absolute value calculator 430 in a direction of $-\pi/4$, around the origin O of the IQ complex plane (S207). Thereafter, the rotation unit 431 stores the I component and the Q component corresponding to the rotated symbols in the storage unit 432, for each of the symbols of the SP signal.

Thereafter, the first ratio calculation processor 433 determines whether a predetermined number of symbols of the SP signal have been received (S208). When no predetermined number of symbols of the SP signal have been received (No at S208), the OE converter 300 performs processing illustrated at Step S202 again. By contrast, when a predetermined number of symbols of the SP signal have been received (Yes at S208), the first ratio calculation processor 433 performs the following processing, with reference to the storage unit 432. Specifically, the first ratio calculation processor 433 calculates a ratio of the width in a direction going away from the origin of the IQ complex plane to a width in a circumferential direction of a circle having a center located on the origin of the IQ complex plane, in a distribution region of symbols of the SP signal in the IQ complex plane (S209). The first ratio calculation processor 433 outputs the calculated ratio to the instruction transmitter 44.

Thereafter, the instruction transmitter 44 retains the value of the ratio outputted from the first ratio calculation processor 433 in association with the control value S (S210). The instruction transmitter 44 adds the first step size $\Delta S_1$ to the control value S (S211). The instruction transmitter 44 determines whether the control value S is larger than the value obtained by adding the first adjustment range $\Delta R_1$ to the initial value $S_0$ (S212). When the control value S is equal to or smaller than the value obtained by adding the first adjustment range $\Delta R_1$ to the initial value $S_0$ (No at S212), the OE converter 300 performs the processing illustrated at Step S202 again.

By contrast, when the control value S is larger than the value obtained by adding the first adjustment range $\Delta R_1$ to the initial value $S_0$ (Yes at S212), the instruction transmitter 44 specifies the value of the minimum ratio, with reference to the retained ratio values. The instruction transmitter 44 specifies the control value S associated with the specified ratio value, as the temporary adjustment value $S_a'$ (S213).

Thereafter, the instruction transmitter 44 calculates a value obtained by subtracting the second adjustment range $\Delta R_2$ from the temporary adjustment value $S_a'$, as the control value S (S214 of FIG. 12). The instruction transmitter 44 transmits a second change instruction including the temporary adjustment value $S_a'$, the second adjustment range $\Delta R_2$, and the second step size $\Delta S_2$ to the optical transmission apparatus 20 through the communication network 13 (S215).

Thereafter, the optical reception apparatus 30 performs reception processing (S216). In the reception processing at Step S216, processing similar to the processing illustrated at Steps S202 to S207 is performed.

Thereafter, the first ratio calculation processor 433 determines whether a predetermined number of symbols of the SP signal have been received (S217). When no predetermined number of symbols of the SP signal have been received (No at S217), the optical reception apparatus 30 performs the processing illustrated at Step S216 again. By contrast, when a predetermined number of symbols of the SP signal have been received (Yes at S217), the first ratio calculation processor 433 performs the following processing, with reference to the storage unit 432. Specifically, the first ratio calculation processor 433 calculates a ratio of the width in a direction going away from the origin of the IQ complex plane to a width in a circumferential direction of a circle having a center located on the origin of the IQ complex plane, in a distribution region of symbols of the SP signal in the IQ complex plane (S218). The first ratio calculation processor 433 outputs the calculated ratio to the instruction transmitter 44.

Thereafter, the instruction transmitter 44 retains the value of the ratio outputted from the first ratio calculation processor 433 in association with the control value S (S219). The instruction transmitter 44 adds the second step size $\Delta S_2$ to the control value S (S220). The instruction transmitter 44 determines whether the control value S is larger than the value obtained by adding the second adjustment range $\Delta R_2$ to the temporary adjustment value $S_a'$ (S221). When the control value S is equal to or smaller than the value obtained by adding the second adjustment range $\Delta R_2$ to the temporary adjustment value $S_a'$ (No at S221), the optical reception apparatus 30 performs the processing illustrated at Step S216 again.

By contrast, when the control value S is larger than the value obtained by adding the second adjustment range $\Delta R_2$ to the temporary adjustment value $S_a'$ (Yes at S221), the instruction transmitter 44 specifies the value of the minimum ratio, with reference to the retained ratio values. The instruction transmitter 44 specifies the control value S associated with the specified ratio value, as the adjustment value $S_a$ (S222). The instruction transmitter 44 transmits a setting instruction including the specified adjustment value $S_a$ to the optical transmission apparatus 20 through the communication network 13 (S223). Thereafter, the optical reception apparatus 30 ends the process illustrated in the present flowchart, and operation of the optical reception apparatus 30 is started.

Advantageous Effects of the First Embodiment

The first embodiment has been explained as described above. As described above, the optical communication system 10 according to the present embodiment includes the optical transmission apparatus 20 and the optical reception apparatus 30. The optical transmission apparatus 20 includes the modulator 204, the skew setting unit 209, the EO converter 211, and the skew controller 212. The SP signal output unit 200 outputs symbols obtained by converting respective bit values in the SP signal of a predetermined bit pattern by the BPSK method using at least one of the I component and the Q component in the IQ complex plane. The skew setting unit 209 sets the skew on the basis of the control value controlling the skew between the I component and the Q component of the symbols of the SP signal. The EO converter 211 converts electrical signals of the I component and the Q component with the skew set with the skew setting unit 209 into optical signals, and transmits the optical signals. When the skew controller 212 receives a setting instruction from the optical reception apparatus 30, the skew controller 212 performs control to cause the skew setting unit 209 to set the control value on the basis of the setting instruction.

In addition, the optical reception apparatus 30 includes the OE converter 300, the equalization processor 305, the extraction unit 42, the first ratio calculation processor 433, and the instruction transmitter 44. The OE converter 300 receives the optical signals transmitted from the optical transmission apparatus 20, and converts the received optical signals into electrical signals. The equalization processor 305 performs suppression processing to suppress fluctuations in amplitude of the electrical signals outputted from the OE converter 300. The extraction unit 42 extracts a plurality of symbols of the SP signal from the electrical signals having been subjected to suppression processing. The first ratio calculator 43 calculates a ratio of a width in a radial direction of a circle having a center located on the origin of the IQ complex plane to a width in a circumferential direction of the circle, in the distribution region of a constellation of symbols of the SP signal extracted with the extraction unit 42 in the IQ complex plane. The instruction transmitter 44 transmits a change instruction to the optical transmission apparatus 20. The instruction transmitter 44 also transmits a setting instruction to instruct the optical transmission apparatus 20 to set the control value specified on the basis of the ratio calculated with the first ratio calculator 43 for each of different control values, to the optical transmission apparatus 20. This structure enables the optical communication system 10 to adjust the skew between the I component and the Q component included in the optical signals transmitted in the optical transmission apparatus 20 with high accuracy.

In addition, in the first embodiment described above, the instruction transmitter 44 of the optical reception apparatus 30 specifies the control value corresponding to the minimum ratio in the ratios calculated with the first ratio calculator 43, as the adjustment value. The instruction transmitter 44 transmits a setting instruction to instruct the optical transmission apparatus 20 to set the specified adjustment value to the optical transmission apparatus 20. This structure enables the optical reception apparatus 30 to adjust the skew between the I component and the Q component included in each of the polarized waves of the optical signals transmitted in the optical transmission apparatus 20 with high accuracy.

In addition, in the first embodiment described above, the instruction transmitter 44 of the optical reception apparatus 30 transmits a change instruction to the optical transmission apparatus 20, to cause the optical transmission apparatus 20 to successively change control values that differ by the value of the first step size $\Delta S_1$. The instruction transmitter 44 specifies the control value corresponding to the minimum ratio among the ratios calculated with the first ratio calculator 43, as the temporary adjustment value. The instruction transmitter 44 further causes the optical transmission apparatus 20 to successively change control values that differ by the value of the second step size $\Delta S_2$ smaller than the first step size $\Delta S_1$, in a range including the specified temporary adjustment value. The instruction transmitter 44 specifies the control value corresponding to the minimum ratio among the ratios calculated with the first ratio calculator 43, as the adjustment value, for each of the control values that differ by the value of the second step size $\Delta S_2$. The instruction transmitter 44 transmits a setting instruction to cause the optical transmission apparatus 20 to set the specified adjustment value to the optical transmission apparatus 20. This structure enables the optical reception apparatus 30 to adjust, with high accuracy and promptly, the skew between the I component and the Q component included in each of the polarized waves of the optical signals transmitted in the optical transmission apparatus 20.

In the first embodiment described above, in symbols of the SP signal, the value of each of bits included in the bit pattern of the SP signal is modulated by the $\pi/4$ BPSK method. The first ratio calculator 43 includes the absolute value calculator 430, the rotation unit 431, and the first ratio calculation processor 433. The absolute value calculator 430 calculates the absolute values of the amplitudes of the I component and the Q component, for each of the symbols of the SP signal. The rotation unit 431 rotates the constellation corresponding to the absolute values of the amplitudes of the I component and the Q component calculated with the absolute value calculator 430 in a direction of $+\pi/4$ or $-\pi/4$ around the origin of the IQ complex plane. The first ratio calculation processor 433 calculates a ratio of a width of the distribution region in a radial direction of a circle having a center located on the origin of the IQ complex plane to a width of the distribution region in a circumferential direction of the circle, in the distribution region of the constellation rotated with the rotation unit 431. This structure enables the first ratio calculator 43 to calculate the ratio of the width of the distribution region in a radial direction of a circle having a center located on the origin of the IQ complex plane to a width of the distribution region in a circumferential direction of the circle, in the distribution region of the constellation of the symbols of the SP signal extracted with the extraction unit 42.

In the first embodiment described above, an optical signal includes a synchronous signal indicating a start timing of symbols of the SP signal. The extraction unit 42 extracts symbols of the SP signal from electrical signals having been subjected to suppression processing with the equalization processor 305, on the basis of the synchronous signal. This structure enables the first ratio calculator 43 to calculate the ratio using the symbols of the SP signal.

[b] Second Embodiment

Figure 13:
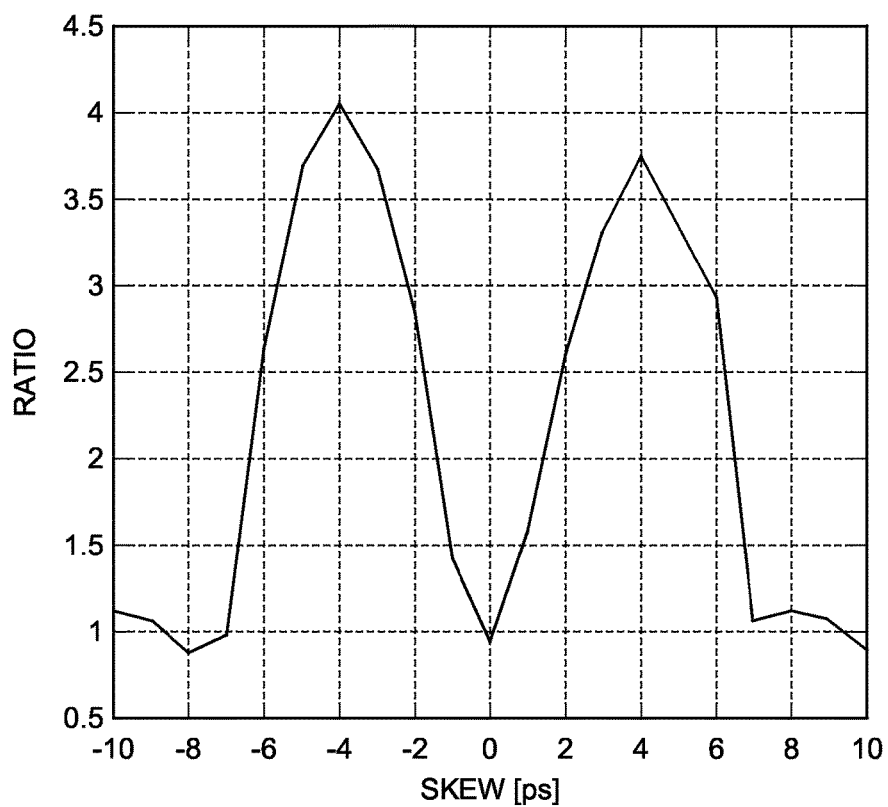
FIG. 13 illustrates a simulation result illustrating an example of relation between the skew and the ratio.

When the value of the skew is small, as the value of the skew increases, the value of the ratio calculated with the first ratio calculator 43 increases, as illustrated in FIG. 13. FIG. 13 illustrates a simulation result illustrating an example of relation between the skew and the ratio. However, when the value of the skew becomes larger than a certain value (±4 picoseconds in the example of FIG. 13), the value of the ratio calculated with the first ratio calculator 43 decreases, as the value of the skew increases. This is because an error in amplitude increases due to influence of adjacent symbols as the value of the skew increases, and the width of the distribution region of the constellation in a radial direction of a circle having a center located on the origin of the IQ complex plane increases. In this manner, the distribution region of the constellation comes close to a circular shape, and the value of the ratio comes close to 1. Accordingly, when the value of the skew set with the initial value $S_0$ for the control value is too large, there are cases where difficulty exists in specifying the control value to reduce the skew with high accuracy.

In the case where the value of the skew is small, with respect to the symbols obtained by modulating bits of the same value, in the optical reception apparatus 30, the symbols are arranged in the same quadrant as the quadrant of the IQ complex plane in which the symbols are arranged in the optical transmission apparatus 20. For this reason, with respect to the symbols obtained by modulating bits of the same value, the ratio with which the symbols are arranged in the quadrant in which the most symbols are arranged is 100%. However, when the value of the skew increases, the optical reception apparatus 30 has a decreased ratio with which the symbols are arranged in the same quadrant as the quadrant in which the symbols are arranged in the optical transmission apparatus 20. For this reason, in the optical reception apparatus 30, with respect to the symbols obtained by modulating bits of the same value, the control value with the minimum skew is included in a range of control values having a predetermined value or more of the ratio with which symbols are arranged in the quadrant in which the most symbols are arranged.

For this reason, in the present embodiment, first, the control value for the skew is successively changed, in a range larger than the range of the control value in calculation of the ratio explained in the first embodiment. In addition, the quadrant of the IQ complex plane in which the most modulated symbols are arranged is specified for each of the control values, and the ratio of the symbols arranged in the specified quadrant is calculated. In the range including the control values having the ratio equal to or higher than the predetermined threshold, one control value is specified as a temporary adjustment value $S_a"$. The processing explained in the first embodiment is performed using the specified temporary adjustment value $S_a"$ as the initial value $S_0$. This structure enables specification of a control value to reduce the skew, with high accuracy.

The following explanation mainly illustrates the points different from the first embodiment. The configuration of the optical communication system 10 according to the second embodiment is similar to that of the optical communication system 10 according to the first embodiment explained with reference to FIG. 1, and a detailed explanation thereof is omitted.

Optical Transmission Apparatus 20

The structure of the optical transmission apparatus 20 according to the second embodiment is similar to the optical transmission apparatus 20 according to the first embodiment explained with reference to FIG. 2, and a detailed explanation thereof is omitted, except for the points explained hereinafter.

The skew controller 212 instructs the signal switching unit 208 to start adjustment, when the skew controller 212 receives a third change instruction from the optical reception apparatus 30 through the communication network 13. The skew controller 212 also performs the following processing for each of the polarized waves. Specifically, the skew controller 212 acquires the initial value $S_0$ of the control value for the skew, a third adjustment range $\Delta R_3$, and a third step size $\Delta S_3$ from the received third change instruction. The third step size $\Delta S_3$ is an example of a third value.

The skew controller 212 causes the skew setting unit 209 to set a control value obtained by subtracting the third adjustment range $\Delta R_3$ from the initial value $S_0$. Whenever a predetermined number (for example, 1000) of symbols of the SP signal are transmitted, the skew controller 212 increases the control value for the skew by the third step size $\Delta S_3$. When the control value becomes larger than a value obtained by adding the third adjustment range $\Delta R_3$ to the initial value $S_0$, the skew controller 212 waits for a first change instruction transmitted from the optical reception apparatus 30.

When a first change instruction is received from the optical reception apparatus 30 through the communication network 13, the skew controller 212 acquires the temporary adjustment value $S_a"$, the first adjustment range $\Delta R_1$, and the first step size $\Delta S_1$ from the received first change instruction. The skew controller 212 causes the skew setting unit 209 to set a control value obtained by subtracting the first adjustment range $\Delta R_1$ from the temporary adjustment value $S_a"$. In addition, whenever a predetermined number (for example, 1000) of symbols of the SP signal are transmitted, the skew controller 212 increases the control value for the skew by the first step size $\Delta S_1$. When the control value becomes larger than a value obtained by adding the first adjustment range $\Delta R_1$ to the temporary adjustment value $S_a"$, the skew controller 212 waits for a second change instruction transmitted from the optical reception apparatus 30. Thereafter, the skew controller 212 performs the same processing as the processing explained in the first embodiment.

Optical Reception Apparatus 30

Figure 14:
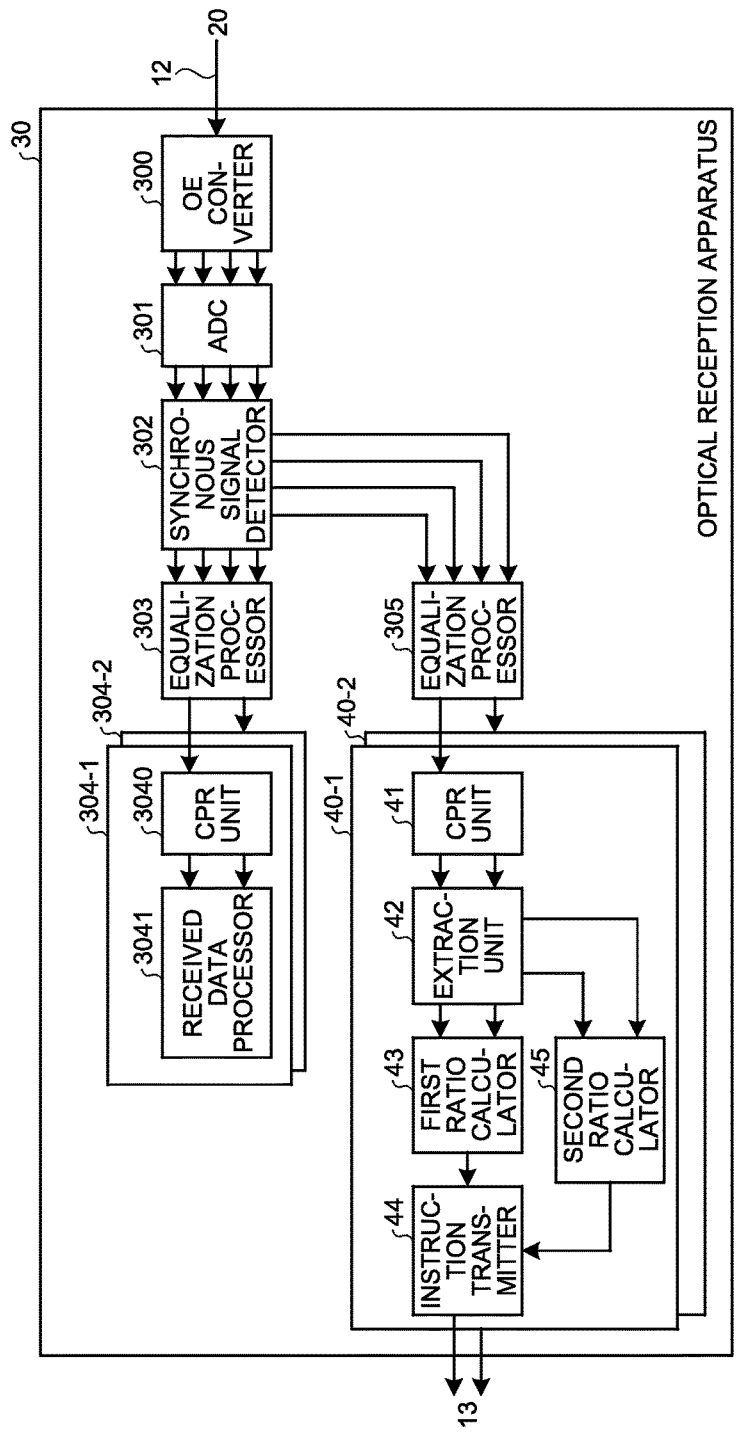
FIG. 14 is a block diagram illustrating an example of the optical reception apparatus according to a second embodiment.

FIG. 14 is a block diagram illustrating an example of the optical reception apparatus 30 according to the second embodiment. Except for the points explained hereinafter, the blocks in FIG. 14 with the same reference numerals as those in FIG. 5 have the same or similar functions as those of the blocks in FIG. 5, and an explanation thereof is omitted. In the present embodiment, each of the adjustment processors 40 further includes a second ratio calculator 45.

The second ratio calculator 45 specifies the quadrant of the IQ complex plane in which the most symbols appear, for each group of the symbols obtained by modulating bits of the same value, on the basis of the symbols of the SP signal extracted with the extraction unit 42, and calculates the ratio of the symbols appearing in the specified quadrant. The second ratio calculator 45 selects one of the values of the calculated ratios for each of the symbols, and outputs the selected value of the ratio to the instruction transmitter 44.

Second Ratio Calculator 45

Figure 15:
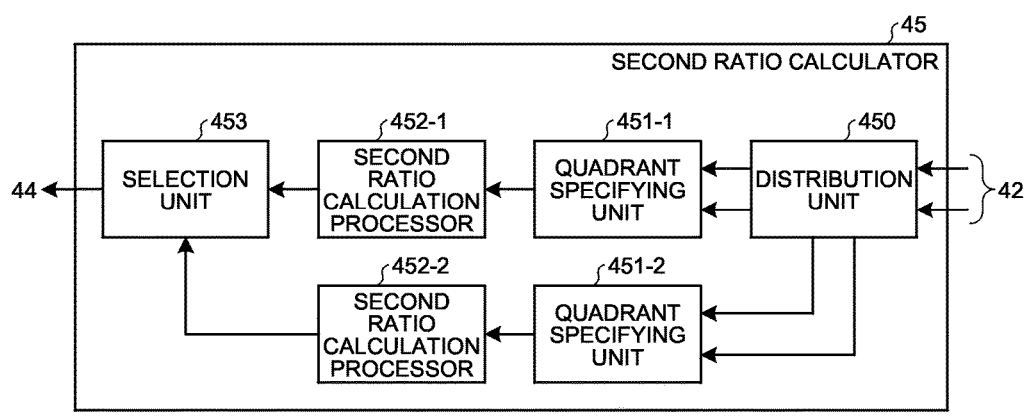
FIG. 15 is a block diagram illustrating an example of a second ratio calculator.

FIG. 15 is a block diagram illustrating an example of the second ratio calculator 45. For example, as illustrated in FIG. 15, the second ratio calculator 45 includes a distribution unit 450, quadrant specifying units 451-1 and 451-2, second ratio calculation processors 452-1 and 452-2, and a selection unit 453. In the following explanation, the quadrant specifying units 451-1 and 451-2 are simply denoted as "quadrant specifying units 451" when they are generally referred to without distinguishing them from each other. The second ratio calculation processors 452-1 and 452-2 are simply denoted as "second ratio calculation processors 452" when they are generally referred to without distinguishing them from each other.

The distribution unit 450 distributes the signals of the I component and the Q component to the quadrant specifying units 451-1 and 451-2, for each group of the symbols obtained by modulating bits of the same value, with respect to the symbols of the SP signal extracted with the extraction unit 42. In the present embodiment, the SP signal is a predetermined bit pattern formed of 0 and 1. In the present embodiment, the SP signal is modulated by the π/4 BPSK method, and each of the symbols corresponding to values of respective bits of the SP signal appears in one of the first quadrant and the third quadrant in the IQ complex plane. The distribution unit 450 retains information relating to the bit pattern of the SP signal in advance. For example, the distribution unit 450 distributes signals of the I component and the Q component of symbols corresponding to bits having the value "1", in the bits of the SP signal, to the quadrant specifying unit 451-1. The distribution unit 450 distributes signals of the I component and the Q component of symbols corresponding to bits having the value "0" to the quadrant specifying unit 451-2.

Each of the quadrant specifying units 451 specifies the quadrant of the IQ complex plane in which the symbol appears, for each of the symbols distributed from the distribution unit 450, on the basis of the signals of the I component and the Q component of the distributed symbol. The quadrant specifying units 451 output information of the quadrant specified for each of the symbols to the respective second ratio calculation processors 452. Specifically, the quadrant specifying unit 451-1 outputs information of the quadrant specified for each of the symbols to the second ratio calculation processor 452-1, and the quadrant specifying unit 451-2 outputs information of the quadrant specified for each of the symbols to the second ratio calculation processor 452-2.

The second ratio calculation processors 452 retain information of the quadrant for each of the symbols outputted from the respective quadrant specifying units 451. When the number of pieces of information of the quadrant for the respective symbols outputted from the quadrant specifying unit 451 reaches a predetermined number (for example, 500), the second ratio calculation processor 452 calculates the ratio of the symbols arranged in the quadrant, for each of the four quadrants in the IQ complex plane, on the basis of the retained quadrant information. For example, when the total number of pieces of information of the quadrant outputted from the quadrant specifying unit 451 is 500, and the quadrant specifying unit 451 outputs 450 pieces of information of the first quadrant in the IQ complex plane, the second ratio calculation processor 452 calculates that the ratio is 90%. The second ratio calculation processor 452 outputs a value indicating the highest ratio from the ratios calculated for the four quadrants in the IQ complex plane to the selection unit 453.

Figure 16:
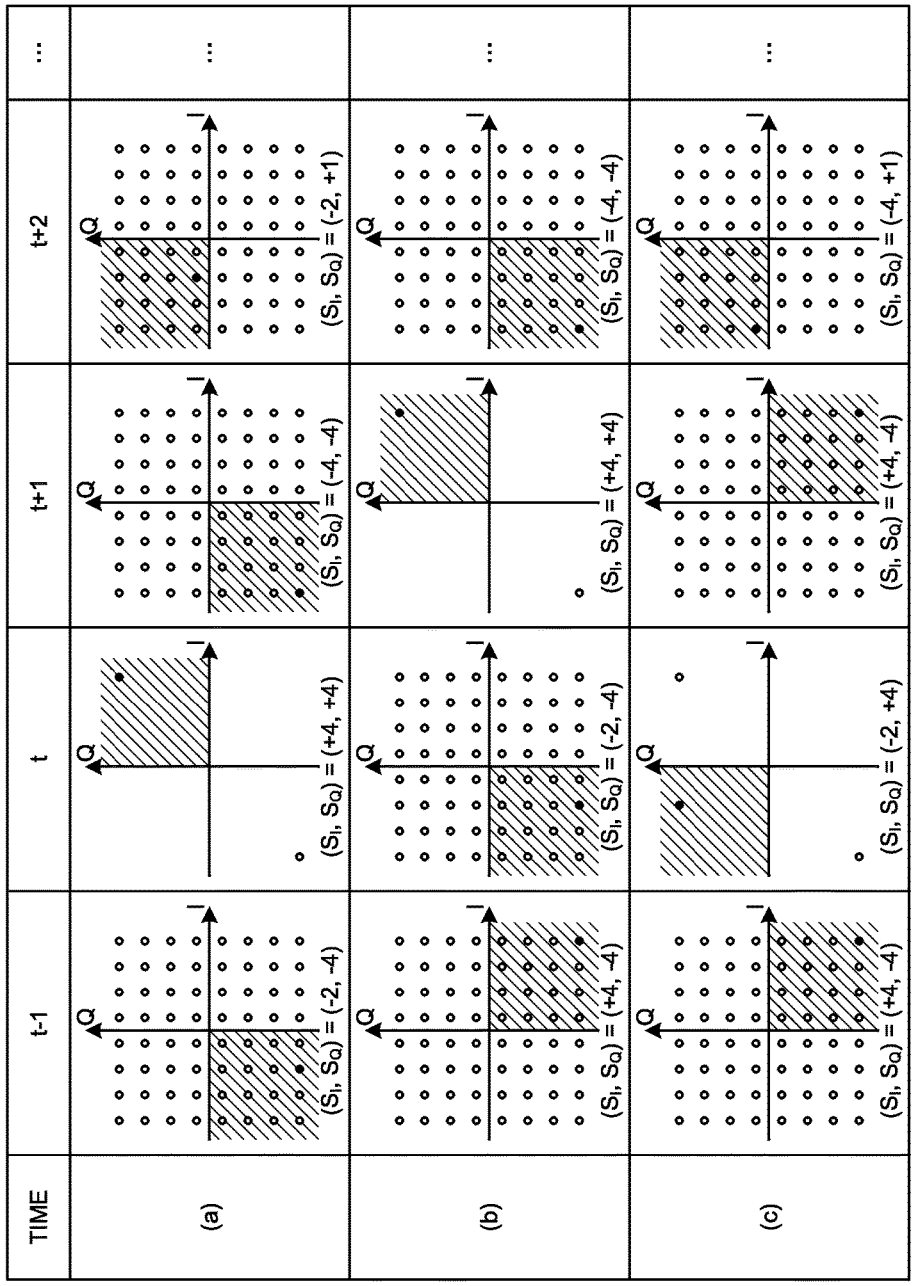
FIG. 16 is a diagram for explaining an example of arrangement of symbols in the case where skew corresponding to a period of a symbol exists.

The following is an explanation of a case where the quadrant in which symbols of the SP signal appear in the optical transmission apparatus 20 differs from the quadrant in which the symbols received in the optical reception apparatus 30 appear, with reference to FIG. 16. FIG. 16 is a diagram for explaining an example of arrangement of symbols in the case where the skew corresponding to a period of a symbol exists. Row (a) in FIG. 16 illustrates symbols mapped on the IQ complex plane in the optical transmission apparatus 20, and row (b) in FIG. 16 illustrates symbols obtained by delaying the symbols of the respective times illustrated in row (a) in FIG. 16 by the period of a symbol. Row (c) in FIG. 16 illustrates symbols obtained by delaying only the signals of the I component by the period of a symbol. Specifically, row (c) in FIG. 16 illustrates arrangement of the symbols in the case where the skew corresponding to the period of a symbol exists.

In the examples illustrated in rows (a) to (c) in FIG. 16, $S_I$ indicates the amplitude of the signal of the I component, and $S_Q$ indicates the amplitude of the signal of the Q component. In the examples illustrated in rows (a) to (c) in FIG. 16, a black circle indicates a mapped symbol, and the hatched quadrant indicates the quadrant I in which a symbol appears. In the examples illustrated in rows (a) to (c) in FIG. 16, a symbol of the SP signal is transmitted at time t, and a symbol of data is transmitted at each of times t−1, t+1, and t+2.

Each of the symbols mapped on the IQ complex plane in row (c) in FIG. 16 includes the I component of the symbol illustrated in row (b) in FIG. 16 and the Q component of the symbol in row (a) in FIG. 16. At the time t−1, the time t, and the time t+1, the symbol in row (a) in FIG. 16 and the symbol in row (c) in FIG. 16 appear in different quadrants. At the time t+2, the symbol in row (a) in FIG. 16 and the symbol in row (c) in FIG. 16 appear in the same quadrant.

As described above, when the skew corresponding to the period of a symbol exists, there are cases where the quadrant in which the symbol of the SP signal received in the optical reception apparatus 30 is arranged differs from the quadrant in which the SP signal is arranged in the optical transmission apparatus 20. Even when the skew is shorter than the period of a symbol, there are cases where the quadrant in which the symbol received in the optical reception apparatus 30 is arranged differs from the quadrant in which the symbol is arranged in the optical transmission apparatus 20, depending on the symbols of data transmitted between the SP signals. The ratio with which the quadrant in which the symbol received in the optical reception apparatus 30 is arranged differs from the quadrant in which the symbol is arranged in the optical transmission apparatus 20 increases as the value of the skew increases.

The explanation will be continued with reference to FIG. 15 again. The selection unit 453 selects one ratio from the ratios outputted from the second ratio calculation processors 452. In the present embodiment, the selection unit 453 selects the lower ratio from the ratios outputted from the second ratio calculation processors 452. The selection unit 453 outputs the selected ratio to the instruction transmitter 44.

The explanation will be continued with reference to FIG. 14 again. In the present embodiment, first, the instruction transmitter 44 transmits a third change instruction to the optical transmission apparatus 20 through the communication network 13, in the adjustment of the skew before start of operation. The third change instruction includes the initial value $S_0$ of the control value for the skew, the third adjustment range $\Delta R_3$, and the third step size $\Delta S_3$. In the present embodiment, the value of the third step size $\Delta S_3$ is larger than the value of the first step size $\Delta S_1$, and the value of the third adjustment range $\Delta R_3$ is larger than the value of the first adjustment range $\Delta R_1$.

In addition, the instruction transmitter 44 acquires the ratio calculated by the second ratio calculator 45 using a predetermined number (for example, 1000) of symbols of the SP signal from the second ratio calculator 45. The instruction transmitter 44 retains the acquired ratio in association with the control value obtained by subtracting the third adjustment range $\Delta R_3$ from the initial value $S_0$. The instruction transmitter 44 retains the acquired ratio in association with the control value obtained by increasing the control value by the third step size $\Delta S_3$, whenever the instruction transmitter 44 acquires the ratio calculated using a predetermined number of symbols of the SP signal from the second ratio calculator 45.

When the control value becomes larger than a value obtained by adding the third adjustment range $\Delta R_3$ to the initial value $S_0$, the instruction transmitter 44 specifies the ratios equal to or larger than the predetermined threshold, among the retained ratios. The instruction transmitter 44 specifies a range of control values including the control values associated with the specified ratios. The instruction transmitter 44 specifies one of the control values included in the specified range, as the temporary adjustment value $S_a''$. In the present embodiment, the instruction transmitter 44 specifies the control value closest to the center of the specified range, as the temporary adjustment value $S_a''$.

Figure 17:
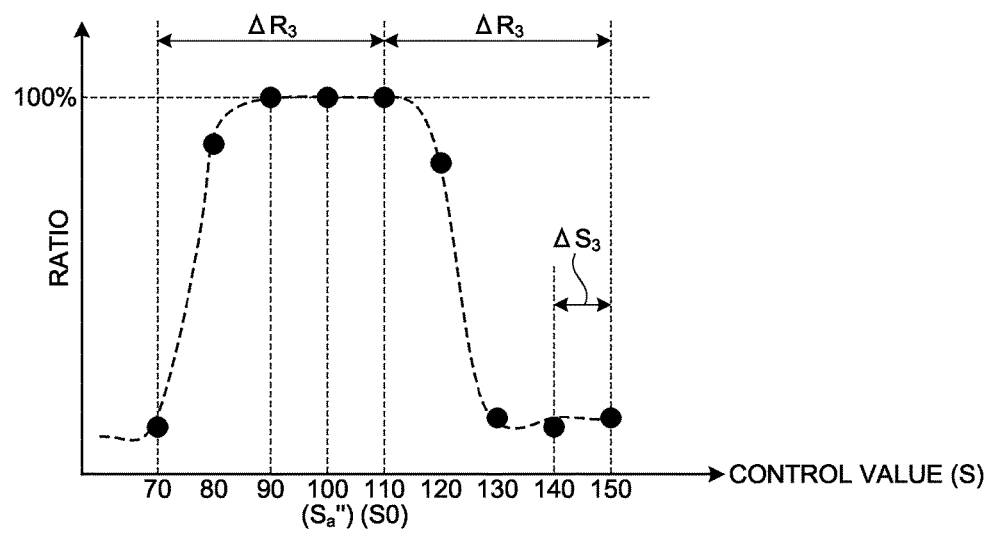
FIG. 17 is a diagram for explaining an example of a method for specifying a temporary adjustment value.

FIG. 17 is a diagram illustrating an example of a method for specifying the temporary adjustment value. As the skew decreases, the ratio calculated with the second ratio calculator 45 increases. For this reason, as illustrated in FIG. 17, the value of the ratio calculated with the second ratio calculator 45 changes according to the control value for the skew. FIG. 17 illustrates an example of the case where the initial value $S_0$ of the control value for the skew is "110", the third adjustment range $\Delta R_3$ is "40", and the third step size $\Delta S_3$ is "10". In the example of FIG. 17, the threshold is "100%", and the control values for the skew corresponding to the ratio equal to or higher than "100%" are three values, that is, "90", "100", and "110". In the present embodiment, a range from "90" to "110" is specified as the range including control values equal to or larger than the threshold, and the control value "100" closest to the center of the specified range is specified as the temporary adjustment value $S_a''$.

Thereafter, the instruction transmitter 44 transmits a first change instruction including the specified temporary adjustment value $S_a''$ to the optical transmission apparatus 20 through the communication network 13. The first change instruction includes the first adjustment range $\Delta R_1$ and the first step size $\Delta S_1$ and the like, as well as the temporary adjustment value $S_a''$.

The instruction transmitter 44 acquires the ratio calculated with the first ratio calculator 43 using a predetermined number (for example, 1000) of symbols of the SP signal, from the first ratio calculator 43. The instruction transmitter 44 retains the acquired ratio in association with the control value serving as a value obtained by subtracting the first adjustment range $\Delta R_1$ from the temporary adjustment value $S_a''$. The instruction transmitter 44 retains the acquired ratio in associated with the control value obtained by increasing the control value by the first step size $\Delta S_1$, whenever the instruction transmitter 44 acquires the ratio calculated using a predetermined number of symbols of the SP signal from the first ratio calculator 43.

When the control value becomes larger than the value obtained by adding the first adjustment range $\Delta R_1$ to the temporary adjustment value $S_a''$, the instruction transmitter 44 refers to the values of the retained ratios. The instruction transmitter 44 specifies the value of the minimum ratio, and specifies the control value associated with the specified ratio value, as the temporary adjustment value $S_a''$. Thereafter, the instruction transmitter 44 performs a process similar to the process explained in the first embodiment.

Operations of Optical Transmission Apparatus 20

Figure 18:
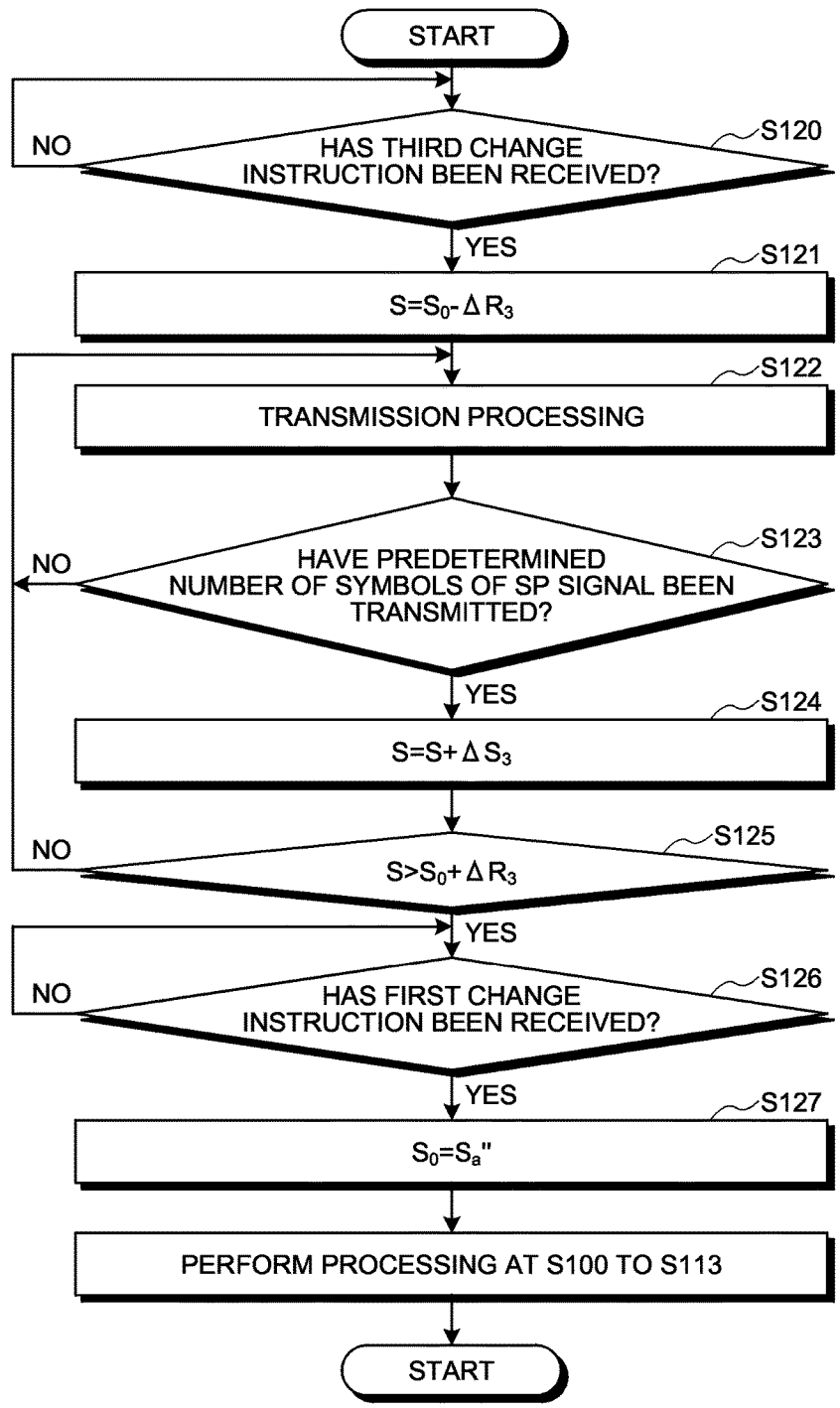
FIG. 18 is a flowchart illustrating an example of operations of the optical transmission apparatus in the second embodiment.

FIG. 18 is a flowchart illustrating an example of operations of the optical transmission apparatus 20 according to the second embodiment. The optical transmission apparatus 20 performs operations illustrated in the present flowchart before start of the operation. Except for the points explained hereinafter, the processes in FIG. 18 with the same reference numerals as those in FIG. 10 are the same processes as those in FIG. 10, and an explanation thereof is omitted.

First, the skew controller 212 determines whether a third change instruction has been received through the communication network 13 (S120). When no third change instruction has been received (No at S120), the skew controller 212 performs the processing illustrated at Step S120, for example, until a third change instruction is received.

By contrast, when a third change instruction has been received (Yes at S120), the skew controller 212 acquires the initial value $S_0$ of the control value for the skew, a third adjustment range $\Delta R_3$, and a third step size $\Delta S_3$ included in the received third change instruction. The skew controller 212 calculates a value obtained by subtracting the third adjustment range $\Delta R_3$ from the initial value $S_0$, as the control value S for the skew (S121). The skew controller 212 causes the skew setting unit 209 to set the calculated control value S. Thereafter, the optical transmission apparatus 20 performs transmission processing (S122). In the transmission processing at Step S122, processing similar to the transmission processing illustrated at Step S102 of FIG. 10 is performed.

Thereafter, the skew controller 212 determines whether a predetermined number of symbols of the SP signal have been transmitted (S123). When no predetermined number of symbols of the SP signal have been transmitted (No at S123), the optical transmission apparatus 20 performs the processing illustrated at Step S122 again.

By contrast, when a predetermined number of symbols of the SP signal have been transmitted (Yes at S123), the skew controller 212 increases the current control value S by the third step size $\Delta S_3$ (S124). Thereafter, the skew controller 212 determines whether the calculated control value S is larger than a value obtained by adding the third adjustment range $\Delta R_3$ to the initial value $S_0$ (S125). When the control value S is equal to or smaller than a value obtained by adding the third adjustment range $\Delta R_3$ to the initial value $S_0$ (No at S125), the skew controller 212 causes the skew setting unit 209 to set the control value S calculated at Step S124. The optical transmission apparatus 20 performs the processing illustrated at Step S122 again.

By contrast, when the control value S is larger than a value obtained by adding the third adjustment range $\Delta R_3$ to the initial value $S_0$ (Yes at S125), the skew controller 212 determines whether a first change instruction has been received through the communication network 13 (S126). When no first change instruction has been received (No at S126), the skew controller 212 performs the processing illustrated at Step S126, for example, until a first change instruction is received.

By contrast, when a first change instruction has been received (Yes at Step S126), the skew controller 212 acquires the temporary adjustment value $S_a''$, the first adjustment range $\Delta R_1$, and the first step size $\Delta S_1$ included in the received first change instruction. The skew controller 212 sets the temporary adjustment value $S_a''$ as the initial value $S_0$ (S127). Thereafter, the processing illustrated at Step S100 to Step S113 in FIG. 10 is performed.

Operations of Optical Reception Apparatus 30

Figure 19:
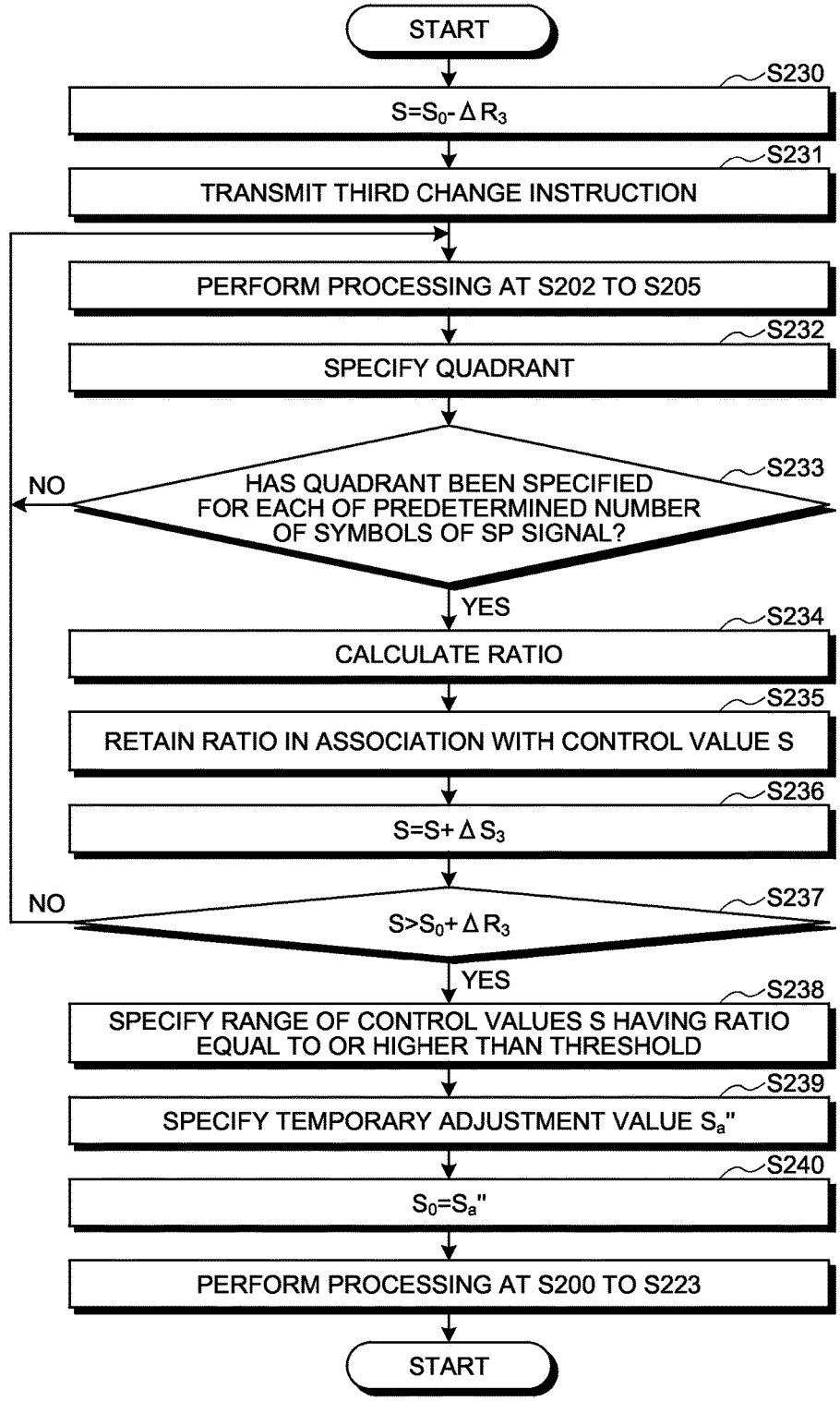
FIG. 19 is a flowchart illustrating an example of operations of the optical reception apparatus according to the second embodiment.

FIG. 19 is a flowchart illustrating an example of operations of the optical reception apparatus 30 according to the second embodiment. The optical reception apparatus 30 performs the operations illustrated in the present flowchart before start of the operation. In FIG. 19, except for the points explained hereinafter, the processes with the same reference numerals as those in FIG. 11 or FIG. 12 are the same processes as those in FIG. 11 or FIG. 12, and an explanation thereof is omitted.

First, the instruction transmitter 44 calculates a value obtained by subtracting the third adjustment range $\Delta R_3$ from the initial value $S_0$ as the control value S (S230). Thereafter, the instruction transmitter 44 transmits a third change instruction including the initial value $S_0$, the third adjustment range $\Delta R_3$, and the third step size $\Delta S_3$ to the optical transmission apparatus 20 through the communication network 13 (S231).

Thereafter, the optical reception apparatus 30 performs the processing illustrated at Steps S202 to S205 of FIG. 11. The distribution unit 450 distributes the signals of the I component and the Q component to the quadrant specifying units 451-1 and 451-2, for each group of the symbols obtained by modulating bits of the same value, with respect to the symbols of the SP signal extracted with the extraction unit 42.

Thereafter, each of the quadrant specifying units 451 specifies the quadrant of the IQ complex plane in which the symbol appears, for each of the symbols distributed from the distribution unit 450, on the basis of the signals of the I component and the Q component of the distributed symbol (S232). Each of the second ratio calculation processors 452 retains information of the quadrant for each of the symbols outputted from the quadrant specifying unit 451.

Thereafter, each of the second ratio calculation processors 452 determines whether the quadrant specifying unit 451 has specified the quadrant for each of a predetermined number of symbols of the SP signal (S233). When the quadrant specifying unit 451 has not specified the quadrant for each of a predetermined number of symbols of the SP signal (No at S233), the optical reception apparatus 30 performs the processing illustrated at Step S202 again.

By contrast, when the quadrant specifying unit 451 has specified the quadrant for each of a predetermined number of symbols of the SP signal (Yes at S233), the second ratio calculation processor 452 calculates the ratio of the symbols arranged in the quadrant, for each of the four quadrants in the IQ complex plane (S234). The selection unit 453 selects, for example, the lower ratio from the values indicating the ratios outputted from the second ratio calculation processors 452.

Thereafter, the instruction transmitter 44 retains the value of the ratio selected with the selection unit 453 in association with the control value S (S235). The instruction transmitter 44 adds the third step size $\Delta S_3$ to the control value S (S236). The instruction transmitter 44 determines whether the control value S is larger than a value obtained by adding the third adjustment range $\Delta R_3$ to the initial value $S_0$ (S237). When the control value S is equal to or smaller than a value obtained by adding the third adjustment range $\Delta R_3$ to the initial value $S_0$ (No at S237), the optical reception apparatus 30 performs the processing illustrated at Steps S202 to S205 again.

By contrast, when the control value S is larger than a value obtained by adding the third adjustment range $\Delta R_3$ to the initial value $S_0$ (Yes at S237), the instruction transmitter 44 specifies ratios equal to or higher than the predetermined threshold, in the retained ratios. The instruction transmitter 44 also specifies a range of the control values S including the control values S associated with the specified ratios (S238). The instruction transmitter 44 specifies the control value closest to the center of the specified range, as the temporary adjustment value $S_a''$ (S239). The instruction transmitter 44 sets the temporary adjustment value $S_a''$ as the initial value $S_0$ (S240). Thereafter, the processing illustrated at Steps S200 to S223 in FIG. 11 and FIG. 12 is performed.

Advantageous Effects of the Second Embodiment

The second embodiment 2 has been described above. The optical reception apparatus 30 according to the present embodiment includes the second ratio calculator 45. The second ratio calculator 45 specifies the quadrant in which the most symbols are arranged, for each group of the symbols obtained by modulating bits of the same value, on the basis of the position of the constellation of the symbols of the SP signal extracted with the extraction unit 42 on the IQ complex plane. The second ratio calculator 45 also calculates the ratio of the symbols of the SP signal arranged in the specified quadrant. The instruction transmitter 44 transmits a change instruction to the optical transmission apparatus 20, to cause the optical transmission apparatus 20 to successively change control values that differ by the third value. The instruction transmitter 44 specifies a temporary adjustment value, on the basis of the values of the ratios calculated by the second ratio calculator 45 for the respective control values that differ by the third value. The instruction transmitter 44 transmits a setting instruction to the optical transmission apparatus 20, to adjust the control values on the basis of the values of the ratios calculated by the first ratio calculator 43 for the respective different control values, in the range including the specified temporary adjustment value. This structure enables the optical communication system 10 to specify the control value to reduce the skew, with high accuracy.

In addition, in the second embodiment described above, the second ratio calculator 45 includes the quadrant specifying units 451, the second ratio calculation processors 452, and the selection unit 453. Each of the quadrant specifying units 451 specifies the quadrant in the IQ complex plane in which the most constellations of the symbols of the SP signal are arranged, for each group of the symbols obtained by modulating bits of the same value, using symbols of the SP signals extracted with the extraction unit 42. Each of the second ratio calculation processors 452 calculates the ratio of the symbols arranged in the specified quadrant for symbols of the SP signal obtained by modulating bits of the same value. The selection unit 453 selects one of the ratios calculated for the symbols of the SP signal obtained by modulating bits of the same value. The instruction transmitter 44 specifies the temporary adjustment value, on the basis of the value of the ratio selected with the selection unit 453. This structure enables the optical communication system 10 to specify the control value to reduce the skew, with high accuracy.

In the second embodiment described above, the instruction transmitter 44 specifies ratios equal to or higher than the predetermined threshold, in the ratios calculated with the second ratio calculator 45, for each of control values that differ by the third value. The instruction transmitter 44 specifies the control value corresponding to the center value in the range including the control values corresponding to the specified ratios, as the temporary adjustment value. This structure enables the instruction transmitter 44 to prevent start of calculation of the ratio with the first ratio calculator 43 in a state in which the actual value of the skew is large. This structure enables the optical communication system 10 to specify the control value to reduce the skew, with high accuracy.

In the second embodiment described above, the third value is larger than the first value. This structure enables the instruction transmitter 44 to more promptly specify the temporary adjustment value, on the basis of the ratio calculated by the second ratio calculator 45.

In the second embodiment described above, in the optical signal, symbols of the SP signal and symbols of data are arranged in a time-division manner such that at least one symbol of the data is disposed between two symbols of the SP signal that are successively transmitted. The symbols of data have a structure in which values of bits in the data of a desired bit pattern are modulated using both the I component and the Q component. This structure enables more reflection of influence of the skew between the I component and the Q component on the ratio calculated by the second ratio calculator 45.

[c] Third Embodiment

The optical communication system 10 according to the first embodiment has the structure of adjusting the skew between the I component and the Q component included in an optical signal outputted from the optical transmission apparatus 20 before start of operation of the optical transmission apparatus 20 and the optical reception apparatus 30. By contrast, the optical communication system 10 according to the present embodiment has a structure in which the value of the ratio calculated with the first ratio calculator 43 is monitored during operation of the optical transmission apparatus 20 and the optical reception apparatus 30. In addition, when the value of the ratio calculated with the first ratio calculator 43 exceeds a threshold with which the skew between the I component and the Q component becomes equal to or smaller than a predetermined value, the control value is adjusted again. This structure maintains the skew in a low state, even when the skew between the I component and the Q component of an optical signal outputted from the optical transmission apparatus 20 changes due to change of the optical transmission apparatus 20 with lapse of time or change in environment thereof.

The following explanation mainly illustrates points different from the first embodiment. The configuration of the optical communication system 10 according to the third embodiment is similar to the optical communication system 10 according to the first embodiment explained with reference to FIG. 1, and illustration thereof is omitted.

Optical Transmission Apparatus 20

The structure of the optical transmission apparatus 20 according to the third embodiment is similar to the optical transmission apparatus 20 according to the first embodiment explained with reference to FIG. 2, and a detailed explanation thereof is omitted, except for the points explained hereinafter.

Figure 20:
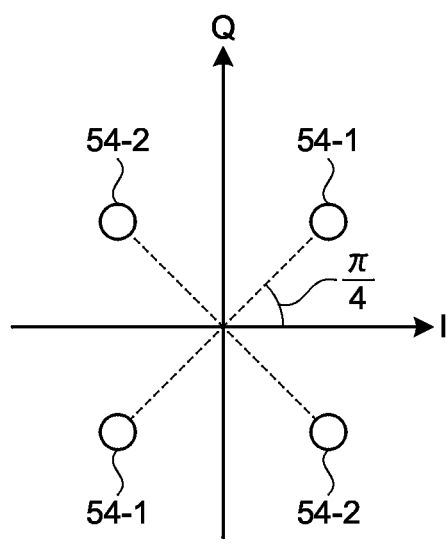
FIG. 20 is a diagram illustrating an example of arrangement of symbols of Data Pilot (DP) signals.

The modulator 206 modulates the DP signal outputted from the DP signal output unit 202, by a modulation method including symbols arranged in the same positions as the positions on the IQ complex plane in which the SP signal is arranged. Specifically, as illustrated in FIG. 3A, each of the symbols of the SP signal is modulated by the π/4 BPSK method, and each of the symbols of the DP signal is modulated by the QPSK method, for example, as illustrated in FIG. 20. FIG. 20 is a diagram illustrating an example of arrangement of symbols of the DP signal. The positions of the symbols 50 of the SP signal illustrated in FIG. 3A are the same as the positions of symbols 54-1 of the DP signal illustrated in FIG. 20, in the IQ complex plane.

The symbols of the SP signal may have a structure in which the symbols 50 are modulated by the π/4 BPSK method to the positions illustrated in FIG. 3B. Also in this case, the positions of the symbols 50 of the SP signal illustrated in FIG. 3B are the same as the positions of symbols 54-2 of the DP signal illustrated in FIG. 20, in the IQ complex plane.

As described above, because the SP signal is modulated by the modulation method of mapping the SP signal to the same symbol positions as those of the DP signal, the equalization processor 303 of the optical reception apparatus 30 is enabled to use the SP signal as part of constellation of the DP signal. This structure enables the equalization processor 303 to compensate linear distortion of each of the symbols outputted from the synchronous signal detector 302 using not only the DP signal but also the SP signal. This structure enables the equalization processor 303 to compensate linear distortion of each of the symbols with high accuracy in accordance with fluctuations in property of the transmission path of the optical signal.

Figure 21:
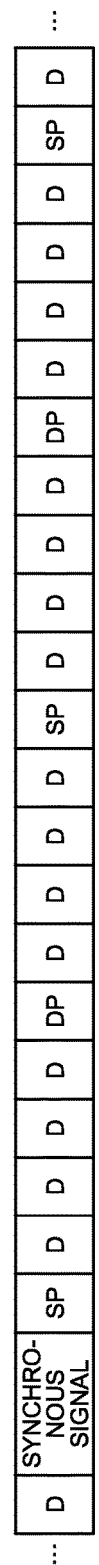
FIG. 21 is a diagram illustrating an example of timings of symbols in a third embodiment.

The signal switching unit 208 generates, for example, a symbol series illustrated in FIG. 21, for each of the polarized waves. FIG. 21 is a diagram illustrating an example of timing of each of the symbols in the third embodiment. FIG. 21 illustrates timing of each of the symbols outputted for one polarized wave. In the example illustrated in FIG. 21, "DP" indicates the timing at which signals of the I component and the Q component corresponding to a symbol of the SP signal are outputted. In the present embodiment, a symbol of the DP signal is transmitted, for example, at every ten symbols. A symbol of the SP signal is transmitted after a symbol of the synchronous signal, for example, at every ten symbols. Symbols of data and a symbol of the DP signal are arranged between two symbols of the SP signal that are successively transmitted. Each of the number of symbols of data and the number of symbols of the DP signal arranged between two symbols of the SP signal that are successively transmitted may be any number, as long as it is 1 or more.

When the operation of the optical transmission apparatus 20 is started, the skew controller 212 waits for a fourth change instruction transmitted from the optical reception apparatus 30 through the communication network 13. The fourth change instruction includes a fourth adjustment range $\Delta R_4$ and a fourth step size $\Delta S_4$. The value of the fourth adjustment range $\Delta R_4$ in the present embodiment is substantially equal to the value of the second adjustment range $\Delta R_2$, or smaller than the second adjustment range $\Delta R_2$. The value of the fourth step size $\Delta S_4$ in the present embodiment is substantially equal to the value of the second step size $\Delta S_2$, or smaller than the second step size $\Delta S_2$. The fourth step size $\Delta S_4$ is an example of a fourth value.

When the skew controller 212 receives a fourth change instruction from the optical reception apparatus 30, the skew controller 212 performs the following processing on each of the polarized waves. Specifically, the skew controller 212 acquires the fourth adjustment range $\Delta R_4$ and the fourth step size $\Delta S_4$ from the received fourth change instruction. The skew controller 212 sets the adjustment value $S_a$ set in the adjustment of the skew before start of the operation, as the initial value $S_0$. The skew controller 212 causes the skew setting unit 209 to set a control value obtained by subtracting the fourth adjustment range $\Delta R_4$ from the initial value $S_0$. The skew controller 212 increases the control value for the skew by the fourth step size $\Delta S_4$, whenever a predetermined number (for example, 1000) of symbols of the SP signal are transmitted. When the control value becomes larger than a value obtained by adding the fourth adjustment range $\Delta R_4$ to the initial value $S_0$, the skew controller 212 waits for a setting instruction from the optical reception apparatus 30.

When a setting instruction is received from the optical reception apparatus 30 through the communication network 13, the skew controller 212 acquires a new adjustment value $S_a$ from the received setting instruction. The skew controller 212 causes the skew setting unit 209 to set the acquired adjustment value $S_a$. Thereafter, the skew controller 212 waits for a fourth change instruction again.

Optical Reception Apparatus 30

Figure 22:
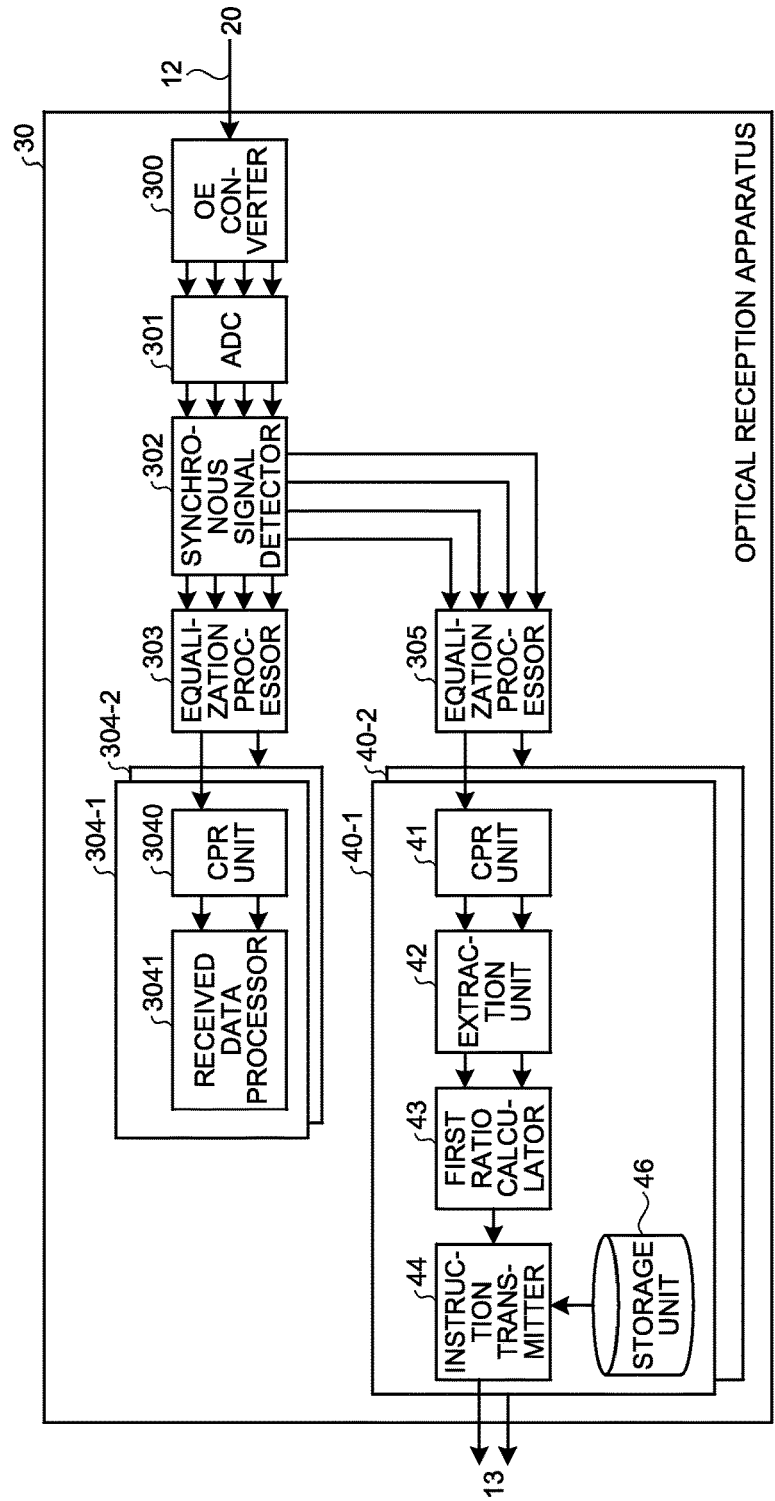
FIG. 22 is a block diagram illustrating an example of the optical reception apparatus in the third embodiment.
Figure 23:
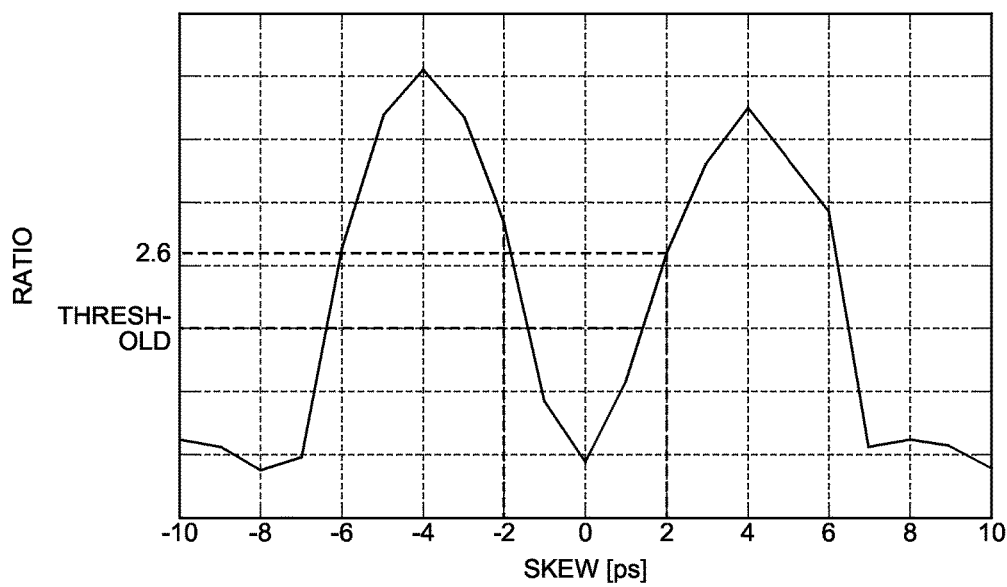
FIG. 23 is a diagram for explaining an example of a threshold.

FIG. 22 is a block diagram illustrating an example of the optical reception apparatus 30 according to the third embodiment. Except for the points explained hereinafter, the blocks in FIG. 22 with the same reference numerals as those in FIG. 5 have the same or similar functions as those of the blocks in FIG. 5, and an explanation thereof is omitted. In the present embodiment, each of the adjustment processors 40 further includes a storage unit 46.

the storage unit 46 stores therein a threshold compared with the ratio calculated with the first ratio calculator 43, in the operation of the optical transmission apparatus 20 and the optical reception apparatus 30. The threshold is set to a value lower than the value of the ratio with which the skew has a value falling within an allowable range. FIG. 23 is a diagram illustrating an example of the threshold. For example, when the allowable range of the value of the skew is ±2 picoseconds, in the example of FIG. 23, the ratio calculated with the first ratio calculator 43 is, for example, 2.6 or less. For this reason, the threshold stored in the storage unit 46 is set to a value lower than 2.6, such as 2.0. The threshold stored in the storage unit 46 is stored in the storage unit 46 in advance by, for example, the manager of the optical communication system 10.

When the optical reception apparatus 30 starts operation, the instruction transmitter 44 monitors whether the value of the ratio calculated with the first ratio calculator 43 is equal to or larger than the threshold stored in the storage unit 46. When the value of the ratio calculated with the first ratio calculator 43 becomes equal to or larger than the threshold stored in the storage unit 46, the instruction transmitter 44 prepares a fourth change instruction including the fourth adjustment range $\Delta R_4$ and the fourth step size $\Delta S_4$. The instruction transmitter 44 transmits the prepared fourth change instruction to the optical transmission apparatus 20 through the communication network 13.

The instruction transmitter 44 acquires the ratio calculated with the first ratio calculator 43 using a predetermined number (for example, 1000) of symbols of the SP signal from the first ratio calculator 43. The instruction transmitter 44 retains the acquired ratio in association with the control value obtained by subtracting the fourth adjustment range ΔR₄ from the adjustment value $S_a$ adjusted before start of the operation. The instruction transmitter 44 retains the acquired ratio in association with the control value obtained by increasing the control value by the fourth step size $\Delta S_4$, whenever the instruction transmitter 44 acquires the ratio calculated using a predetermined number of symbols of the SP signal from the first ratio calculator 43.

When the control value becomes larger than the value obtained by adding the fourth adjustment range $\Delta R_4$ to the adjustment value $S_a$, the instruction transmitter 44 specifies the minimum ratio in the retained ratios. The instruction transmitter 44 specifies the control value associated with the specified ratio, as the new adjustment value $S_a$. The instruction transmitter 44 transmits a setting instruction including the specified new adjustment value $S_a$ to the optical transmission apparatus 20 through the communication network 13. The instruction transmitter 44 monitors again whether the value of the ratio calculated with the first ratio calculator 43 is equal to or larger than the threshold stored in the storage unit 46.

Operations of the Optical Transmission Apparatus 20

Figure 24:
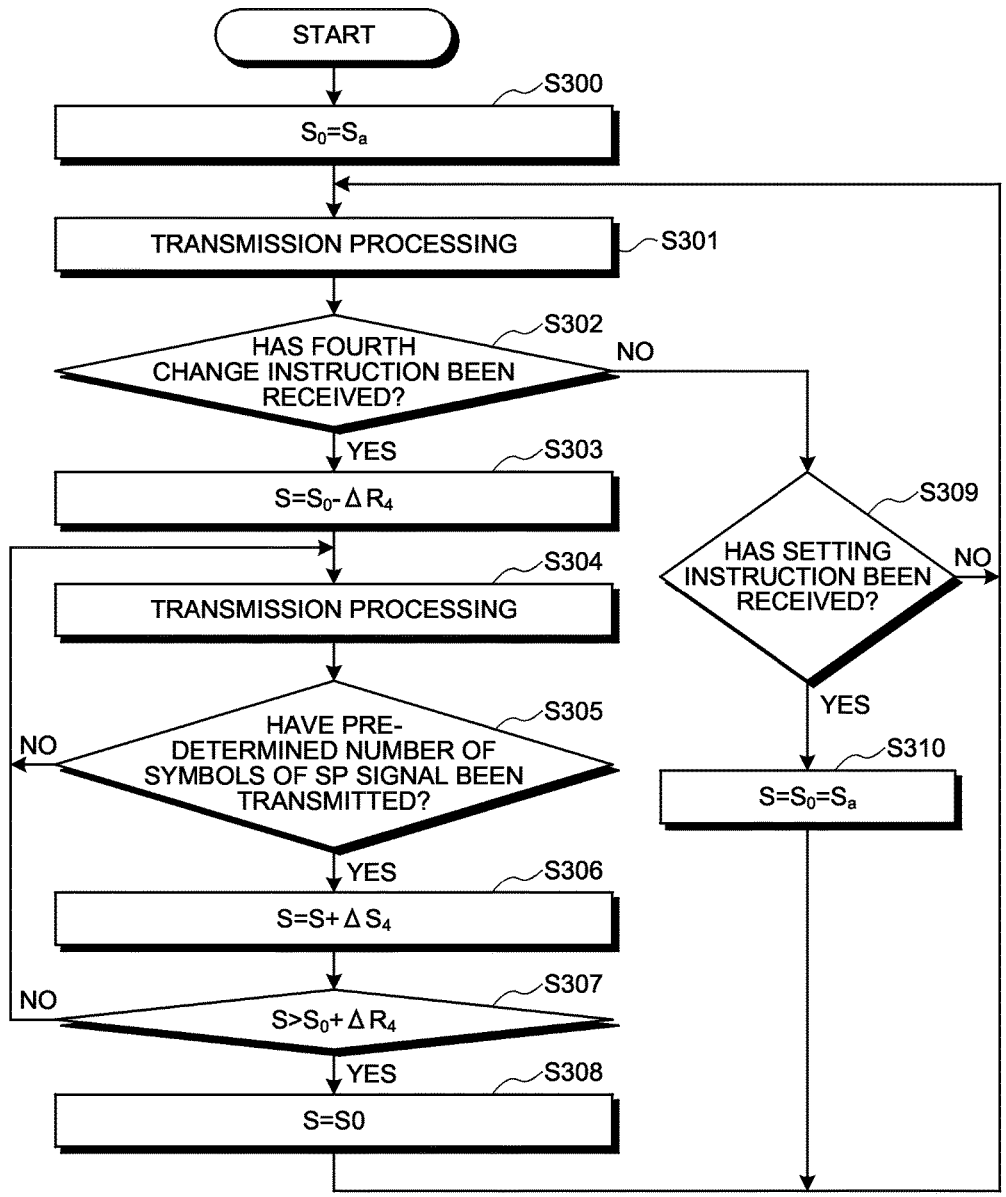
FIG. 24 is a flowchart illustrating an example of operations of the optical transmission apparatus in the third embodiment.

FIG. 24 is a flowchart illustrating an example of operations of the optical transmission apparatus 20 according to the third embodiment. The optical transmission apparatus 20 starts the operations illustrated in the present flowchart, for example, after the optical transmission apparatus 20 performs the process illustrated in FIG. 10 before start of the operation. After the process illustrated in FIG. 10 is performed, the adjustment value $S_a$ is set in the skew setting unit 209.

First, the skew controller 212 sets the adjustment value $S_a$ set with the process illustrated in FIG. 10, as the initial value $S_0$ (S300). Thereafter, the optical transmission apparatus 20 performs transmission processing (S301). At Step S301, the modulator 204 generates symbols of the SP signal, the modulator 205 generates symbols of the synchronous signal, the modulator 206 generates symbols of the DP signal, and the modulator 207 generates symbols of the data. The signal switching unit 208 switches the symbols of the SP signal outputted from the modulator 204, the symbols of the synchronous signal outputted from the modulator 205, the symbols of the DP signal outputted from the modulator 206, and the symbols of the data outputted from the modulator 207. The skew setting unit 209 sets the skew between the I component and the Q component of each of the symbols outputted from the signal switching unit 208, on the basis of the control value S instructed from the skew controller 212. The electrical signals of the I component and the Q component with the set skew are converted into optical signals, and transmitted.

Thereafter, the skew controller 212 determines whether a fourth change instruction has been received through the communication network 13 (S302). When a fourth change instruction has been received (Yes at Step S302), the skew controller 212 acquires the fourth adjustment range $\Delta R_4$ and a fourth step size $\Delta S_4$ included in the received fourth change instruction.

Thereafter, the skew controller 212 calculates a value obtained by subtracting the fourth adjustment range $\Delta R_4$ from the initial value $S_0$, as a control value S for the skew (S303). Thereafter, the skew controller 212 causes the skew setting unit 209 to set the calculated control value S. Thereafter, the optical transmission apparatus 20 performs transmission processing (S304). In the transmission processing at Step S304, processing similar to the transmission processing illustrated at Step S301 is performed.

Thereafter, the skew controller 212 determines whether a predetermined number of symbols of the SP signal have been transmitted (S305). When no predetermined number of symbols of the SP signal have been transmitted (No at S305), the optical transmission apparatus 20 performs the processing illustrated at S304 again. By contrast, when a predetermined number of symbols of the SP signal have been transmitted (Yes at S305), the skew controller 212 increases the current control value S by the fourth step size $\Delta S_4$ (S306). Thereafter, the skew controller 212 determines whether the calculated control value S is larger than a value obtained by adding the fourth adjustment range $\Delta R_4$ to the initial value $S_0$ (S307).

When the control value S is equal to or smaller than the value obtained by adding the fourth adjustment range $\Delta R_4$ to the initial value $S_0$ (No at S307), the skew controller 212 causes the skew setting unit 209 to set the control value S calculated at Step S306. Thereafter, the optical transmission apparatus 20 performs the processing illustrated at Step S304 again. By contrast, when the control value S is larger than the value obtained by adding the fourth adjustment range $\Delta R_4$ to the initial value $S_0$ (Yes at S307), the skew controller 212 causes the skew setting unit 209 to set the initial value $S_0$ as the control value S (S308). Thereafter, the optical transmission apparatus 20 performs the processing illustrated at Step S301 again.

When no fourth change instruction has been received (No at S302), the skew controller 212 determines whether a setting instruction has been received through the communication network 13 (S309). When no setting instruction has been received (No at S309), the optical transmission apparatus 20 performs the processing illustrated at Step S301 again.

By contrast, when a setting instruction has been received (Yes at S309), the skew controller 212 acquires the adjustment value $S_a$ included in the received setting instruction. Thereafter, the skew controller 212 sets the adjustment value $S_a$ as the control value S and the initial value $S_0$ (S310). Thereafter, the skew controller 212 causes the skew setting unit 209 to set the control value S. Thereafter, the optical transmission apparatus 20 performs the processing illustrated at Step S301 again.

Operations of the Optical Reception Apparatus 30

Figure 25:
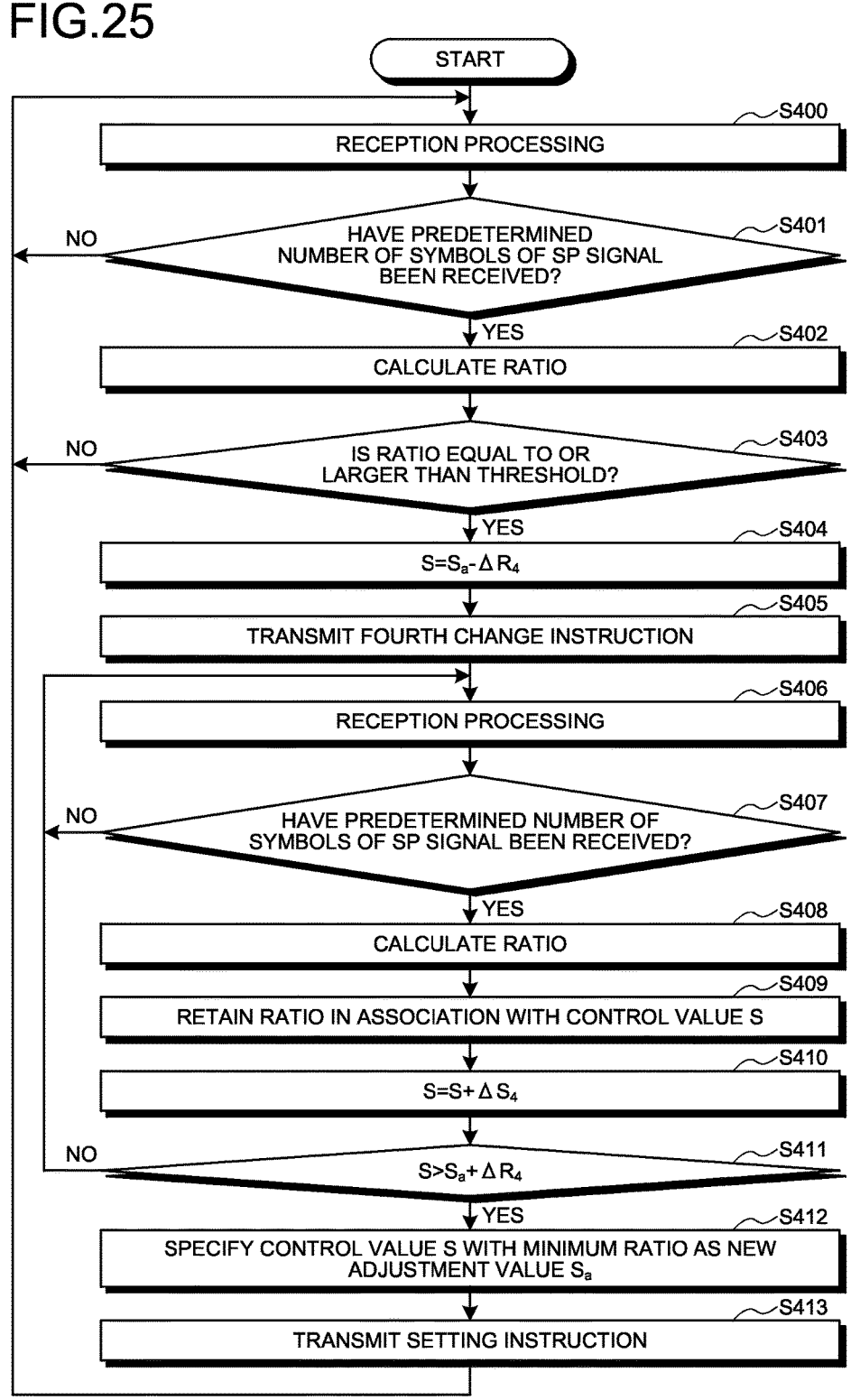
FIG. 25 is a flowchart illustrating an example of operations of the optical reception apparatus in the third embodiment.

FIG. 25 is a flowchart illustrating an example of operations of the optical reception apparatus 30 according to the third embodiment. The optical reception apparatus 30 starts the operations illustrated in the present flowchart, after the optical reception apparatus 30 performs the processes illustrated in FIG. 11 and FIG. 12, for example, before start of the operation. With the processes illustrated in FIG. 11 and FIG. 12, the instruction transmitter 44 specifies the adjustment value $S_a$.

First, the optical reception apparatus 30 performs reception processing (S400). In the reception processing at Step S400, processing similar to the processing illustrated at Steps S202 to S207 in FIG. 11 is performed. The first ratio calculation processor 433 determines whether a predetermined number of symbols of the SP signal have been received (S401). When no predetermined number of symbols of the SP signal have been received (No at S401), the optical reception apparatus 30 performs the processing illustrated at Step S400 again.

By contrast, when a predetermined number of symbols of the SP signal have been received (Yes at S401), the first ratio calculation processor 433 performs the following processing with reference to the storage unit 432. Specifically, the first ratio calculation processor 433 calculates a ratio of the width in a direction going away from the origin of the IQ complex plane to a width in a circumferential direction of a circle having a center located on the origin of the IQ complex plane, in a distribution region of symbols of the SP signal in the IQ complex plane (S402). The first ratio calculation processor 433 outputs the calculated ratio to the instruction transmitter 44.

Thereafter, the instruction transmitter 44 acquires the threshold stored in the storage unit 46. The instruction transmitter 44 determines whether the value of the ratio calculated with the first ratio calculator 43 is equal to or larger than the threshold acquired from the storage unit 46 (S403). When the value of the ratio calculated with the first ratio calculator 43 is smaller than the threshold (No at S403), the optical reception apparatus 30 performs the processing illustrated at Step S400 again.

By contrast, when the value of the ratio calculated with the first ratio calculator 43 is equal to or larger than the threshold (Yes at S403), the instruction transmitter 44 calculates a value obtained by subtracting the fourth adjustment range $\Delta R_4$ from the adjustment value $S_a$ specified by the processes illustrated in FIG. 11 and FIG. 12, as the control value S (S404). The instruction transmitter 44 transmits a fourth change instruction including the fourth adjustment range $\Delta R_4$ and the fourth step size $\Delta S_4$ to the optical transmission apparatus 20 through the communication network 13 (S405).

Thereafter, the optical reception apparatus 30 performs reception processing (S406). In the reception processing at Step S406, processing similar to the processing illustrated at Steps S202 to S207 in FIG. 11 is performed. The first ratio calculation processor 433 determines whether a predetermined number of symbols of the SP signal have been received (S407). When no predetermined number of symbols of the SP signal have been received (No at S407), the optical reception apparatus 30 performs the processing illustrated at Step S406 again.

By contrast, when a predetermined number of symbols of the SP signal have been received (Yes at S407), the first ratio calculation processor 433 performs the following processing with reference to the storage unit 432. Specifically, the first ratio calculation processor 433 calculates a ratio of the width in a direction going away from the origin of the IQ complex plane to a width in a circumferential direction of a circle having a center located on the origin of the IQ complex plane, in a distribution region of symbols of the SP signal in the IQ complex plane (S408). The first ratio calculation processor 433 outputs the calculated ratio to the instruction transmitter 44.

Thereafter, the instruction transmitter 44 retains the value of the ratio outputted from the first ratio calculation processor 433, in association with the control value S (S409). Thereafter, the instruction transmitter 44 adds the fourth step size $\Delta S_4$ to the control value S (S410). The instruction transmitter 44 determines whether the control value S is larger than a value obtained by adding the fourth adjustment range $\Delta R_4$ to the control value S (S411). When the control value S is equal to or smaller than a value obtained by adding the fourth adjustment range $\Delta R_4$ to the control value S (No at S411), the optical reception apparatus 30 performs the processing illustrated at Step S406 again.

By contrast, when the control value S is larger than a value obtained by adding the fourth adjustment range $\Delta R_4$ to the control value S (Yes at S411), the instruction transmitter 44 specifies the value of the minimum ratio, with reference to the retained ratio values. The instruction transmitter 44 specifies the control value S associated with the specified ratio value, as the new adjustment value $S_a$ (S412). The instruction transmitter 44 transmits a setting instruction including the specified new adjustment value $S_a$ to the optical transmission apparatus 20 through the communication network 13 (S413). The optical reception apparatus 30 performs the processing illustrated at Step S400 again.

Advantageous Effects of the Third Embodiment

The third embodiment has been described above. As described above, the instruction transmitter 44 of the present embodiment monitors the value of the ratio calculated with the first ratio calculator 43, after the adjustment value is set in the optical transmission apparatus 20. When the ratio becomes a value equal to or larger than the predetermined threshold, the instruction transmitter 44 transmits a change instruction to the optical transmission apparatus 20, to cause the optical transmission apparatus 20 to successively change a plurality of control values that differ by the value of the fourth step size $\Delta R_4$, in the range of the adjustment values including the adjustment value. The instruction transmitter 44 specifies the minimum value in the ratios calculated with the first ratio calculator 43 for the respective control values that differ by the value of the fourth step size $\Delta S_4$. The instruction transmitter 44 further specifies the control value corresponding to the specified minimum value of the ratio, as the adjustment value $S_a$. Thereafter, the instruction transmitter 44 transmits a setting instruction to cause the optical transmission apparatus 20 to set the adjustment value $S_a$ to the optical transmission apparatus 20. This structure suppresses increase in skew due to change in the optical transmission apparatus 20 with lapse of time or change in environment, in the operation of the optical transmission apparatus 20.

In addition, the optical signal in the third embodiment described above includes symbols of data, and symbols of the DP signal having a structure in which values of bits in a predetermined bit pattern are modulated by a method different from that of the SP signal using both the I component and the Q component. In addition, symbols of the SP signal, symbols of the DP signal, and symbols of data are arranged in a time-division manner such that a symbol of the DP signal and a symbol of the data is disposed between two symbols of the SP signal that are successively transmitted. This structure enables the optical reception apparatus 30 to adjust the skew again using symbols of the SP signal, in the operation.

In the third embodiment described above, symbols of the DP signal are modulated by a modulation method to include symbols arranged in the same positions as positions on the IQ complex plane in which the symbols of the SP signal are arranged. This structure enables the equalization processor 303 to compensate linear distortion of each of the symbols with high accuracy, in accordance with fluctuations in property of the transmission path of the optical signal.

Hardware

Figure 26:
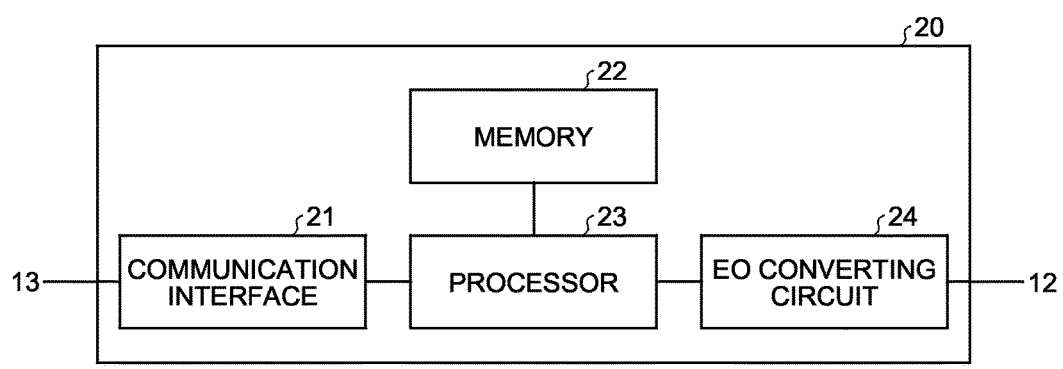
FIG. 26 is a diagram illustrating an example of hardware of the optical transmission apparatus.

The optical transmission apparatus 20 in each of the embodiments described above is achieved with, for example, hardware illustrated in FIG. 26. FIG. 26 is a diagram illustrating an example of the hardware of the optical transmission apparatus 20. For example, as illustrated in FIG. 26, the optical transmission apparatus 20 includes a communication interface 21, a memory 22, a processor 23, and an EO converting circuit 24.

The communication interface 21 receives data transmitted from the optical reception apparatus 30 through the communication network 13, and outputs the data to the processor 23. The EO converting circuit 24 converts an electrical signal generated with the processor 23 into an optical signal for each of the polarized waves, synthesizes the converted optical signals of the polarized waves, and transmits the optical signal to the optical reception apparatus 30 through the cable 12. The EO converting circuit 24 achieves functions of the DAC 210 and the EO converter 211, and the like.

The memory 22 includes, for example, a random access memory (RAM) and a read only memory (ROM). The memory 22 stores therein programs or the like to achieve functions of the SP signal output unit 200, the synchronous signal output unit 201, the DP signal output unit 202, and the transmission data output unit 203. The memory 22 also stores therein programs or the like to achieve functions of the modulator 204, the modulator 205, the modulator 206, the modulator 207, the signal switching unit 208, the skew setting unit 209, and the skew controller 212.

The processor 23 includes, for example, a central processing unit (CPU), a field programmable gate array (FPGA), or a digital signal processor (DSP). The processor 23 reads and executes programs from the memory 22, to achieve functions of, for example, the SP signal output unit 200, the synchronous signal output unit 201, the DP signal output unit 202, and the transmission data output unit 203. The processor 23 reads and executes programs from the memory 22, to achieve functions of, for example, the modulator 204, the modulator 205, the modulator 206, the modulator 207, the signal switching unit 208, the skew setting unit 209, and the skew controller 212.

Figure 27:
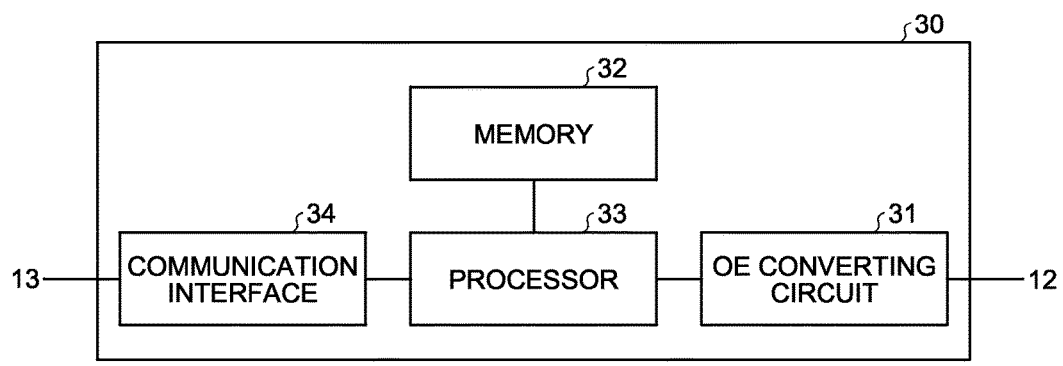
FIG. 27 is a diagram illustrating an example of hardware of the optical reception apparatus.

The optical reception apparatus 30 in each of the embodiments described above is achieved with, for example, hardware illustrated in FIG. 27. FIG. 27 is a diagram illustrating an example of the hardware of the optical reception apparatus 30. For example, as illustrated in FIG. 27, the optical reception apparatus 30 includes an OE converting circuit 31, a memory 32, a processor 33, and a communication interface 34.

The OE converting circuit 31 divides the optical signal received through the cable 12 into an optical signal of the I component and an optical signal of the Q component for each of the polarized waves, and converts the optical signal of the I component and the optical signal of the Q component into electrical signals. The OE converting circuit 31 converts the electrical signal of the I component and the electrical signal of the Q component for each of the polarized waves from analog signals into digital signals, and outputs the signals to the processor 33. The OE converting circuit 31 achieves functions of the OE converter 300 and the ADC 301. The communication interface 34 transmits the signal outputted from the processor 33 to the optical transmission apparatus 20 through the communication network 13.

The memory 32 includes, for example, a RAM or a ROM. The memory 32 stores therein programs to achieve functions of the synchronous signal detector 302, the equalization processor 303, the receivers 304, the equalization processor 305, and the adjustment processors 40.

The processor 33 includes, for example, a CPU, a FPGA, or a DSP. The processor 33 reads and executes programs from the memory 32, to achieve the functions of, for example, the synchronous signal detector 302, the equalization processor 303, the receivers 304, the equalization processor 305, and the adjustment processors 40.

All the programs in the memory 22 and the programs in the memory 32 are not always stored in the memory 22 and the memory 32 at first. For example, the programs may be stored in a portable recording medium, such as a memory card inserted into the transmission apparatus 11, and the processor 23 and the processor 33 may acquire and execute the program of the part used for processing from such a portable recording medium. The transmission apparatus 11 may acquire and execute programs from another computer or a server device storing the programs therein through a wireless communication line, a public line, the Internet, a LAN, or a WAN.

Others

The disclosed technique is not limited to the embodiments described above, but can be variously modified within the range of the gist of the embodiments.

For example, in the first embodiment described above, the instruction transmitter 44 specifies a temporary adjustment value $S_a'$, on the basis of an optical signal with a control value changed on the basis of the first change instruction, and specifies the adjustment value $S_a$ on the basis of an optical signal with a control value changed on the basis of the second change instruction. However, the disclosed technique is not limited thereto. For example, the instruction transmitter 44 may specify the adjustment value $S_a$, on the basis of an optical signal with a control value changed on the basis of the first change instruction.

In addition, in the second embodiment described above, the instruction transmitter 44 specifies a temporary adjustment value $S_a''$, on the basis of an optical signal with a control value changed on the basis of the third change instruction, but the disclosed technique is not limited thereto. For example, the instruction transmitter 44 may specify the temporary adjustment value $S_a''$ again, by specifying the temporary adjustment value $S_a''$ and thereafter further changing the control value more minutely in a predetermined range including the temporary adjustment range $S_a''$ as the center. This structure improves the accuracy of the temporary adjustment value $S_a''$.

In the first embodiment described above, the instruction transmitter 44 specifies the temporary adjustment value $S_a'$ and the adjustment value $S_a$ on the basis of the ratio calculated with the first ratio calculator 43, and transmits the specified temporary adjustment value $S_a'$ and the adjustment value $S_a$ to the optical transmission apparatus 20, but the disclosed technique is not limited thereto. For example, the instruction transmitter 44 may transmit the ratio calculated for each of the control values changed in accordance with the first change instruction or the second change instruction to the optical transmission apparatus 20, and the skew controller 212 may specify the temporary adjustment value $S_a'$ and the adjustment value $S_a$ on the basis of the received ratio. Also in the second embodiment described above, the instruction transmitter 44 may transmit the ratio calculated for each of the control values changed in accordance with the third change instruction to the optical transmission apparatus 20, and the skew controller 212 may specify the temporary adjustment value $S_a''$ on the basis of the received ratio. Also in the third embodiment described above, the instruction transmitter 44 may transmit the ratio calculated for each of the control values changed in accordance with the fourth change instruction to the optical transmission apparatus 20, and the skew controller 212 may specify the new adjustment value $S_a$ on the basis of the received ratio.

In each of the embodiments described above, the processing blocks included in the optical transmission apparatus 20 and the optical reception apparatus 30 are divided on the basis of functions in accordance with main processing details, to facilitate understanding of the optical transmission apparatus 20 and the optical reception apparatus 30 in each of the embodiments. For this reason, the disclosed technique is not limited by the method for dividing the processing blocks and the names thereof. The processing blocks included in the optical transmission apparatus 20 and the optical reception apparatus 30 in each of the embodiments described above may be further divided into more processing blocks according to the processing details, or a plurality of processing blocks may be integrated into one processing block. The processing performed with each of the processing blocks may be achieved with processing performed with software, or achieved with dedicated hardware, such as an application specific integrated circuit (ASIC).

An aspect of the optical reception apparatus, the optical transmission apparatus, the optical communication system, and the skew adjusting method disclosed in the present application produces the effect of enabling adjustment of the skew with high accuracy.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical reception apparatus comprising:
a memory; and
a processor coupled to the memory, wherein the processor executes a process comprising:
receiving an optical signal including a plurality of first pilot symbols obtained by modulating values of bits in a predetermined bit pattern by an optical transmission apparatus by a BPSK method in an IQ complex plane, and converting the received optical signal into an electrical signal;
performing suppression processing to suppress fluctuations in amplitude of the electrical signal;
extracting the first pilot symbols from the electrical signal having been subjected to the suppression processing;
first calculating a ratio of an amplitude component to a phase component of each of the first pilot symbols extracted by the extracting; and
transmitting information relating to skew adjustment based on the ratio of the amplitude component to the phase component calculated by the first calculating for each of a plurality of different control values for skew to the optical transmission apparatus.

2. The optical reception apparatus according to claim 1, wherein the transmitting includes specifying the control value corresponding to a minimum ratio in the ratios of the amplitude component to the phase component calculated by the first calculating, and transmitting the specified control value, as the information relating to skew adjustment, to the optical transmission apparatus.

3. The optical reception apparatus according to claim 2, wherein
the transmitting includes transmitting a change instruction to the optical transmission apparatus, to cause the optical transmission apparatus to successively change the control values that differ by a first value, specifying the control value corresponding to the minimum ratio in the ratios calculated by the first calculating, as temporary information relating to skew adjustment, and causing the optical transmission apparatus to further successively change the control values that differ by a second value smaller than the first value, in a range including the control value corresponding to the specified temporary information relating to skew adjustment, and
the transmitting includes transmitting the control value corresponding to the minimum ratio in the ratios calculated by the first calculating for the respective control values that differ by the second value to the optical transmission apparatus, as the information relating to skew adjustment.

4. The optical reception apparatus according to claim 3, wherein
the transmitting includes monitoring a value of the ratio calculated by the first calculating, after the control value corresponding to the information relating to skew adjustment is set in the optical transmission apparatus, and transmitting the change instruction to the optical transmission apparatus when the ratio becomes a value equal to or larger than a first threshold, to cause the optical transmission apparatus to successively change the control values that differ by a fourth value, in a range including the control value corresponding to the information relating to skew adjustment, and
the transmitting includes specifying the control value corresponding to the minimum ratio in the ratios calculated by the first calculating for the respective control values that differ by the fourth value, specifying the specified control value as new information relating to skew adjustment, and transmitting the specified new information relating to skew adjustment to the optical transmission apparatus.

5. The optical reception apparatus according to claim 1, wherein
the first pilot symbols are obtained by modulating values of respective bits included in the bit pattern by a $\pi/4$ PSK method, and
the first calculating includes:
calculating absolute values of amplitudes of an I component and a Q component of each of the first pilot symbols;
rotating a constellation corresponding to the absolute values calculated in a direction of $+\pi/4$ or $-\pi/4$ around an origin of the IQ complex plane; and
calculating a ratio of a width in a circumferential direction of a circle having a center located on the origin of the IQ complex plane to a width in a radial direction of the circle, in a distribution region of the constellation rotated by the rotating, as the ratio.

6. The optical reception apparatus according to claim 1, wherein the process further comprising:
second calculating includes specifying a quadrant of the IQ complex plane in which most first pilot symbols appear, for each group of the first pilot symbols obtained by modulating bits of an equal value, based on positions of the constellation of the first pilot symbols extracted by the extracting on the IQ complex plane, and calculating a ratio of the first pilot symbols appearing in the specified quadrant, and
the transmitting includes transmitting a change instruction to the optical transmission apparatus to cause the optical transmission apparatus to successively change the control values that differ by a third value, specifying temporary information relating to skew adjustment, based on values of the ratio calculated by the second calculating for the respective control values that differ by the third value, and transmitting the control value specified based on the values of the ratios calculated by the first calculating for the respective control values to the optical transmission apparatus, as the information relating to skew adjustment, in a range including the control value corresponding to the specified temporary information relating to skew adjustment.

7. The optical reception apparatus according to claim 6, wherein
the second calculating includes:
a specifying a quadrant in the IQ complex plane in which most constellations of the first pilot symbols are arranged, for each group of the first pilot symbols obtained by modulating bits of an equal value using the first pilot symbols extracted by the extracting;
calculating a ratio of the first pilot symbols arranged in the specified quadrant, for each group of the first pilot symbols obtained by modulating bits of an equal value; and
selecting one of the ratios calculated for each group of the first pilot symbols obtained by modulating bits of an equal value, and
the transmitting includes specifying the temporary information relating to skew adjustment, based on a value of the ratio selected by the selecting.

8. The optical reception apparatus according to claim 6, wherein
the transmitting includes specifying ratios equal to or higher than a predetermined threshold in the ratios calculated by the second calculating for the respective control values that differ by the third value, and specifying the control value corresponding to a center value in a range including the control values corresponding to the specified ratios, as the temporary information relating to skew adjustment.

9. The optical reception apparatus according to claim 6, wherein the third value is larger than the first value.

10. The optical reception apparatus according to claim 1, wherein
the optical signal includes a synchronous signal indicating start timing of the first pilot symbols, and
the extracting includes extracting the first pilot symbols from the electrical signal having been subjected to the suppression processing, with the synchronous signal used as reference.

11. The optical reception apparatus according to claim 1, wherein the optical signal has a structure in which the first pilot symbols and symbols of data having an arbitrary bit pattern are arranged in a time-division manner such that at least one of the symbols of the data obtained by modulating values of bits in the data using both the I component and the Q component is arranged between successively transmitted two of the first pilot symbols.

12. The optical reception apparatus according to claim 11, wherein the optical signal includes the symbols of the data and second pilot symbols obtained by modulating values of bits in a predetermined bit pattern by a method different from the method of the first pilot symbols using the I component and the Q component, and the first pilot symbols, the second pilot symbols, and the symbols of the data are arranged in a time-division manner such that the second pilot symbols and the symbols of the data are arranged between successively transmitted two of the first pilot symbols.

13. The optical reception apparatus according to claim 12, wherein the second pilot symbols are modulated by a modulation method including symbols arranged in positions equal to positions in which the first pilot symbols are arranged on the IQ complex plane.

14. An optical transmission apparatus comprising:
a memory; and
a processor coupled to the memory, wherein the processor executes a process comprising:
outputting pilot symbols obtained by modulating values of bits in a predetermined bit pattern by a BPSK method in an IQ complex plane;
controlling skew between an I component and a Q component of the pilot symbols based on information relating to skew adjustment; and
converting electrical signals of the I component and the Q component with the skew controlled by the controlling into optical signals, and transmitting the optical signals, wherein
the controlling includes controlling the skew between the I component and the Q component of the pilot symbols using a control value specified based on a ratio calculated for each of different control values, when the information relating to skew adjustment is received from an optical reception apparatus, the ratio serving as a ratio of an amplitude component to a phase component of the pilot symbols extracted from electrical signals having been subjected to suppression processing, the electrical signals being obtained by converting the pilot symbols included in the optical signals received in the optical reception apparatus, and the suppression processing being performed to suppress fluctuations in amplitude of the electrical signals after the pilot symbols are converted into the electrical signals.

15. An optical communication system comprising:
an optical transmission apparatus; and
an optical reception apparatus that receives optical signals transmitted from the optical transmission apparatus,
the optical transmission apparatus comprising:
a first memory; and
a first processor coupled to the first memory, wherein the first processor executes a first process comprising:
outputting pilot symbols obtained by modulating values of bits in a predetermined bit pattern by a BPSK method in an IQ complex plane;
controlling skew between an I component and a Q component of the pilot symbols based on information relating to skew adjustment; and
converting electrical signals of the I component and the Q component with the skew controlled by the controlling into the optical signals, and transmitting the optical signals, and
the optical reception apparatus comprising:
a second memory; and
a second processor coupled to the second memory, wherein the second processor executes a second process comprising:
receiving the optical signals transmitted from the optical transmission apparatus, and converting the received optical signals into electrical signals;
performing suppression processing to suppress fluctuations in amplitude of the electrical signals;
extracting the pilot symbols from the electrical signals having been subjected to the suppression processing;
calculating a ratio of an amplitude component to a phase component of each of the pilot symbols extracted by the extracting; and transmitting information relating to skew adjustment based on the ratio of the amplitude component to the phase component for each of a plurality of different control values to the optical transmission apparatus.

16. A skew adjusting method for adjusting skew between an I component and a Q component in an optical communication system including an optical transmission apparatus that includes an I component modulator and a Q component modular and an optical reception apparatus that receives an optical signal transmitted from the optical transmission apparatus, the skew adjusting method comprising:

converting pilot symbols obtained by modulating values of bits in a predetermined bit pattern by a BPSK method in an IQ complex plane into an optical signal, and transmitting the optical signal, by the optical transmission apparatus;

receiving the optical signal transmitted from the optical transmission apparatus, and converting the received optical signal into an electrical signal, by the optical reception apparatus;

performing suppression processing to suppress fluctuations in amplitude of the electrical signal, by the optical reception apparatus;

extracting the pilot symbols from the electrical signal having been subjected to the suppression processing, by the optical reception apparatus;

calculating a ratio of an amplitude component to a phase component of each of the extracted pilot symbols, by the optical reception apparatus; and adjusting skew between the I component and the Q component, based on the ratio of the amplitude component to the phase component calculated for each of a plurality of different control values, by the optical reception apparatus.

* * * * *